United States Patent
Kidachi et al.

(10) Patent No.: US 7,161,766 B2
(45) Date of Patent: Jan. 9, 2007

(54) BASE PLATE STRUCTURE, TRANSFER SYSTEM, AND METHOD AND APPARATUS FOR ASSEMBLING A HEAD GIMBAL ASSEMBLY

(75) Inventors: Takao Kidachi, Yamato (JP); Tadaaki Tomiyama, Chofu (JP); Yoshio Uematsu, Fujisawa (JP); Hiromi Ishikawa Ishikawa, Fujisawa (JP); Tatsushi Yoshida, Chigasaki (JP); Hiroyoshi Yokome, Fujisawa (JP); Yukihiro Nakamura, Fujisawa (JP); Hisashi Ohyama, Yamato (JP); Tatsumi Tsuchiya, Ayase (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 57 days.

(21) Appl. No.: 10/929,507

(22) Filed: Aug. 30, 2004

(65) Prior Publication Data

US 2005/0024777 A1    Feb. 3, 2005

Related U.S. Application Data

(62) Division of application No. 09/989,633, filed on Nov. 20, 2001, now Pat. No. 6,823,581.

(30) Foreign Application Priority Data

Nov. 22, 2000  (JP) .......................... 920000359US3

(51) Int. Cl.
*G11B 5/48* (2006.01)

(52) U.S. Cl. .............................. 360/245.2; 360/244.5; 29/737

(58) Field of Classification Search ............. 360/245.2, 360/244.5; 29/737
See application file for complete search history.

(56) References Cited

U.S. PATENT DOCUMENTS

| | | | |
|---|---|---|---|
| 4,397,074 A |   | 8/1983 | Thornton et al. |
| 5,299,081 A | * | 3/1994 | Hatch et al. ............. 360/244.2 |
| 5,832,764 A | * | 11/1998 | Girard ........................ 72/16.3 |
| 5,886,857 A | * | 3/1999 | Symons et al. .......... 360/245.2 |
| 5,932,065 A |   | 8/1999 | Mitchell |
| 6,052,258 A | * | 4/2000 | Albrecht et al. ......... 360/245.2 |
| 6,154,952 A | * | 12/2000 | Tangren ................... 29/603.04 |
| 6,266,869 B1 | * | 7/2001 | Tracy et al. .................. 29/740 |
| 6,466,412 B1 | * | 10/2002 | Adams et al. ........... 360/245.2 |
| 6,571,455 B1 | * | 6/2003 | Takagi et al. ............ 29/603.03 |
| 6,632,310 B1 | * | 10/2003 | Freeman et al. ............ 156/182 |
| 2005/0237661 A1 | * | 10/2005 | Blake et al. .................. 360/92 |

FOREIGN PATENT DOCUMENTS

| | | | |
|---|---|---|---|
| JP | 53-4970 | | 1/1978 |
| JP | 62-157325 A | * | 7/1987 |

* cited by examiner

*Primary Examiner*—Jefferson Evans
(74) *Attorney, Agent, or Firm*—Duke Amaniampong; Dillin & Yudell LLP

(57) ABSTRACT

A base plate and load beam for an HG assembly are formed in series, stacked, and transferred by a transfer system in the form of the stacked-layer series to undergo the necessary assembly processes such as layer joining, slider attachment, and electrical connections between the terminals thereon. The base plate structure comprises a band portion having conveying holes and positioning holes formed at a predetermined pith respectively in a longitudinal direction. A plurality of the base plates are disposed via connecting portions integrally formed at a predetermined pitch at edges on one side of the band portion.

3 Claims, 24 Drawing Sheets

(a)

(b)

BASE PLATE STRUCTURE, TRANSFER SYSTEM, AND METHOD AND APPARATUS FOR ASSEMBLING A HEAD GIMBAL ASSEMBLY

RELATED APPLICATION

The present application Ser. No. 09/989,633 is a divisional of U.S. Pat. No. 6,823,581, filed on Nov. 20, 2001, and entitled "A Base Plate Structure, A Transfer System, And Method And Apparatus For Assembling A Head Gimbal Assembly," which is incorporated herein by reference.

BACKGROUND OF THE INVENTION

1. Technical Field

The present invention relates to an apparatus and method of assembling a head gimbal assembly (to be referred to as an HG assembly) for a hard disk drive. More specifically, the invention relates to an apparatus and method of assembling an HG assembly by using members in a series state.

2. Description of the Related Art

Referring to FIGS. 25 through 29, the construction of a HG assembly is shown. FIG. 25 is a perspective view showing the appearance of an HG assembly 51 (a suspension section 59 to be described later) before a slider is attached thereto, and FIG. 26 is an exploded view showing the configuration. The HG assembly 51 comprises a stacked layer structure of a base plate 52, a load beam 53, and a flexure 54. A flat surface 53a of the load beam 53 is joined to an opposed flat surface 52a of the base plate 52 by a method to be described later.

In this case, positioning is accomplished such that an opening 53c of the load beam 53 is superimposed on an opening 52c of the base plate 52, a reference opening 53b of the load beam 53 is superimposed on a reference opening 52b of the base plate 52, and an edge 52d of the base plate 52 is aligned with an indicator line 201 along the longer sides of an oblong opening 53d formed in the load beam 53. The load beam 53 is made of an elastic stainless steel having a thickness of approximately 0.038 to 0.05 mm, so that it is made thin, light, and can be kept sufficiently stiff.

Flanges 53e for strengthening the load beam are formed at the edges of a tapered portion 53m excluding an area near the oblong opening 53d. The tapered portion 53m extends longitudinally from the joined portion between the load beam 53 and the base plate 52. The portion where the oblong opening 53d is formed corresponds to a hinge portion 53f. The hinge portion maintains resilience even after it has been bent, as will be described later.

A tapered oval-shaped guide opening 53g and a generally rectangular opening 53h are formed in the tapered portion 53m. A gimbal pivot 53i to be described later, that lifts upwards, is formed in the protruding portion that extends from the center of the hinge portion 53f side of the opening 53h to the center of the opening 53h, and a tab 53j is formed at the leading end of the tapered portion 53m through the medium of a warped support 53k.

The flexure 54 is made of a stainless steel with desired elasticity and a thickness of approximately 20 micrometers, for example, and part of the flexure is fixedly joined to the load beam 53. At this point, the reference opening 54b of the flexure 54 is superimposed on the reference opening 53b of the load beam 53, and the guide opening 54c of the flexure 54 is superimposed on the guide opening 53g of the load beam 53. The portion of the flexure 54 leading from an indicator line 202 is not joined so as to be movable.

An extendable joint 54d is formed in the flexure 54. The joint is disposed in a position to be superimposed on the hinge portion 53f of the load beam 53 so as not to prevent the elastic action of the hinge portion 53f when the flexure is joined to the load beam 53. An arch-shaped opening 54e is formed in the unjoined portion of the flexure 54, and a flexure tongue 54f protruding toward the center of the opening 54e is formed in the center of the bottom close to the leading end of the flexure 54.

An integral-type conducting lead 55 having four leads is also disposed on the flexure 54. In the integral-type conducting lead 55, four leads 55a to 55d (refer to FIG. 26) are provided so as not to touch to each other through a very thin insulating sheet 55e. One end of each of the leads is disposed on a connector portion 54a of the flexure 54. These lead ends are aligned so as to form a multi-connector 55f. The other ends of the leads are formed such that they can be respectively connected to the pads for four bonding pads 56a to 56d (shown in FIG. 29) formed in the slider 56.

The hinge portion 53f of the load beam 53 of the HG assembly 51 excluding the slider 56, configured as described above, is bent by approximately 19 degrees, for example, as shown in the dot-dash line in FIG. 25. This bending occurs due to plastic deformation, so that this bending angle is naturally maintained. Herein, the parts that exclude the slider 56 from the HG assembly 51, shown in FIG. 25, will be referred to as a suspension section 59.

In the slider 56, a magneto resistive read head to be referred to as an MR head 57 for reading data and an electromagnetic induction-type write head 58 are disposed in predetermined positions. Incidentally, the heads in FIG. 26 are just illustrated for reference, so that their positions in the drawing are not accurate ones. Each of the heads has two leads not shown, and leads are connected to the four bonding pads 56a to 56d shown in FIG. 29, respectively. The slider 56 is attached to the flexure tongue 54f of the flexure in FIG. 27 to be described later, with an adhesive.

Next, the arrangement of a pair of flexure arms 54g and 54h formed on both sides of the opening 54e of the flexure 54, a pair of openings 54i and 54j formed in the vicinity of the leading end of the flexure 54, the gimbal pivot 53i formed in the load beam 53, and the slider 56 attached to the flexure tongue 54f will be described.

FIG. 27 is a partially expanded view of the leading end of the HG assembly 51 before the slider 56 is attached, or the suspension section 59. FIG. 28 is a vertical sectional view of the portion indicated by an indicator line 203 in FIG. 27, as seen in the direction of arrow H. FIG. 29 is a perspective view of the leading end of the HG assembly 51 with the slider 56 attached to the flexure tongue 54f.

As described before, the gimbal pivot 53i (shown in FIG. 28) is formed in the load beam 53. The flexure arms 54g and 54h of the flexure 54, which extend without being joined elastically support the flexure tongue 54f coupled thereto. The flexure tongue 54f is brought into contact with and supported by the gimbal pivot 53i due to joining of the flexure 54 to the load beam 53. The contact point is on an axis 200X in FIG. 27, corresponding to the center line of the flexure 54 in the longitudinal direction. An axis 200Y that passes through the contact point and is perpendicular to the axis 200X is also shown in FIG. 27. At this time of the contact, the flexure arms 54g and 54h are bent to some extent to press the flexure tongue 54f against the gimbal pivot 53i.

The slider 56 is attached to the flexure tongue 54f such that its center is generally superimposed over the point where the flexure tongue 54f keeps in contact with the gimbal pivot 53i, as indicated by the broken line in FIG. 28.

The slider 56 can be thereby rotated to some extent with respect to the axes 200X and 200Y, and can be tilted to a predetermined degree in all directions.

The four leads 55a to 55d (in FIG. 27) are fixed to the flexure 54 up to a leading end 55g of the insulating sheet 55e. The four leads are also fixed to a platform 53n in the leading end of the flexure 54 through the insulating sheet 55e, on the opposite side of the flexure tongue 54f with the two openings 54i and 54j interposed therebetween.

From the leading end 55g of the insulating sheet 55e to the platform 53n, the four leads 55a to 55d are bent along the flexure arms 54g and 54h in pairs to shape like cranks, being suspended in air without being brought into contact to each other. The other ends of the paired leads 55a to 55d are bent to extend from the platform 53n to the flexure tongue 54 through the two openings 54i and 54j, and then comprise the lead pads 55h to 55k for the bonding pads 56a to 56d (in FIG. 29), respectively. The bonding pads are formed in the slider 56 to be attached to the flexure tongue 54f.

As shown in FIG. 28, although part of the lead pad 55i is supported by the platform 53n for the strengthening purpose, the lead pad 55i, for the most part, is suspended in air. Further, it is preferable to form the lead pad 55i to have approximately the same thermal capacity as the bonding pad 56b. Other lead pads are formed in the same manner.

Further, as shown in FIG. 27, a pair of crank-shaped limiters 54m and 54n that extend downwards are formed on both sides of the flexure tongue 54f of the flexure 54. When the flexure 54 is joined to the load beam 53, the limiters 54m and 54n are disposed with their leading ends extended downwards through the opening 53h of the load beam 53, as shown in FIG. 28. With this arrangement, if the unjoined portion of the flexure 54 is displaced to be further separated from the load beam 53 by some action, the leading ends of the limiters 54m and 54n are brought into contact with an underside 53q of the load beam 53, thereby serving to prevent the flexure and the load beam from being separated more than necessary.

When the HG assembly 51 configured as described above is assembled, trays or blocks are conventionally prepared as assembling jigs, and the base plate 52, load beam 53, and flexure 54 are positioned by using these assembling jigs to be stacked and then joined to one after another.

In order to complete the manufacturing process of the suspension section 59, the hinge portion 53f of the suspension section 59 of the HG assembly 51 is bent in the direction of arrow F (in FIG. 25) by approximately 19 degrees, for example, before the slider 56 is attached. When the slider 56 is attached to the flexure tongue 54f of the suspension section 59 and then the bonding pads of the slider are electrically connected to the lead pads of leads, trays or blocks are also used as the assembling jigs for positioning or fixing each of the members.

3. Problems to be Solved by the Invention

As described above, when uncompleted HG assemblies are transferred for each of the manufacturing processes, the assembly should always be mounted on the assembly jig such as a tray or a block for transference. For this reason, it becomes necessary to prepare the assembling jigs that are at least numerically equal to the uncompleted HG assemblies remaining at the respective manufacturing processes. Thus, the space efficiency of workspace is reduced, and the workplace is put in disorder. In addition, manufacturing cost rises with the number of the assembling jigs required, and management of these assembling jigs is time-consuming and inconvenient.

The process of attaching the slider and the process of connecting the slider to the leads are performed with the hinge portion of the HG assembly already bent. Accordingly, after these processes are finished, the bending state of the hinge portion might be changed and might not be kept in the desired state.

It is accordingly an object of the present invention to provide a more efficient method of assembling an HG assembly that eliminates the need for assembling jigs such as trays or blocks during its manufacturing processes. Another object of the invention is to provide a method of assembling an HG assembly, which reduces variations in the bending state of the hinge portion, thereby enhancing yield.

SUMMARY OF THE INVENTION

Various embodiments of an apparatus and method for assembling a hard disk drive HG assembly are disclosed. When uncompleted HG assemblies are transferred for each of the manufacturing processes, the uncompleted HG assembly should always be mounted on the assembly jig such as a tray or a block for transference. For this reason, assembling jigs, the number of which is at least equal to the number of the uncompleted HG assemblies remaining at the respective assembly processes would be needed. Accordingly, the efficiency of work space is reduced, and a rise in manufacturing cost is brought about by the need for the assembling jigs.

A base plate and a load beam that comprise stacked-layer members for an HG assembly are respectively formed in a series manner. A load beam series 4 is stacked on a base plate series 3 and transferred by a transfer system 2 in the form of the stacked-layer series to undergo the necessary assembly processes such as layer joining, slider attachment, and electrical connections between the terminals thereon.

BRIEF DESCRIPTION OF THE DRAWINGS

FIG. 9(a) is a front view and FIG. 9(b) is a top view.

DETAILED DESCRIPTION OF AN ILLUSTRATIVE EMBODIMENT

Figure 1:
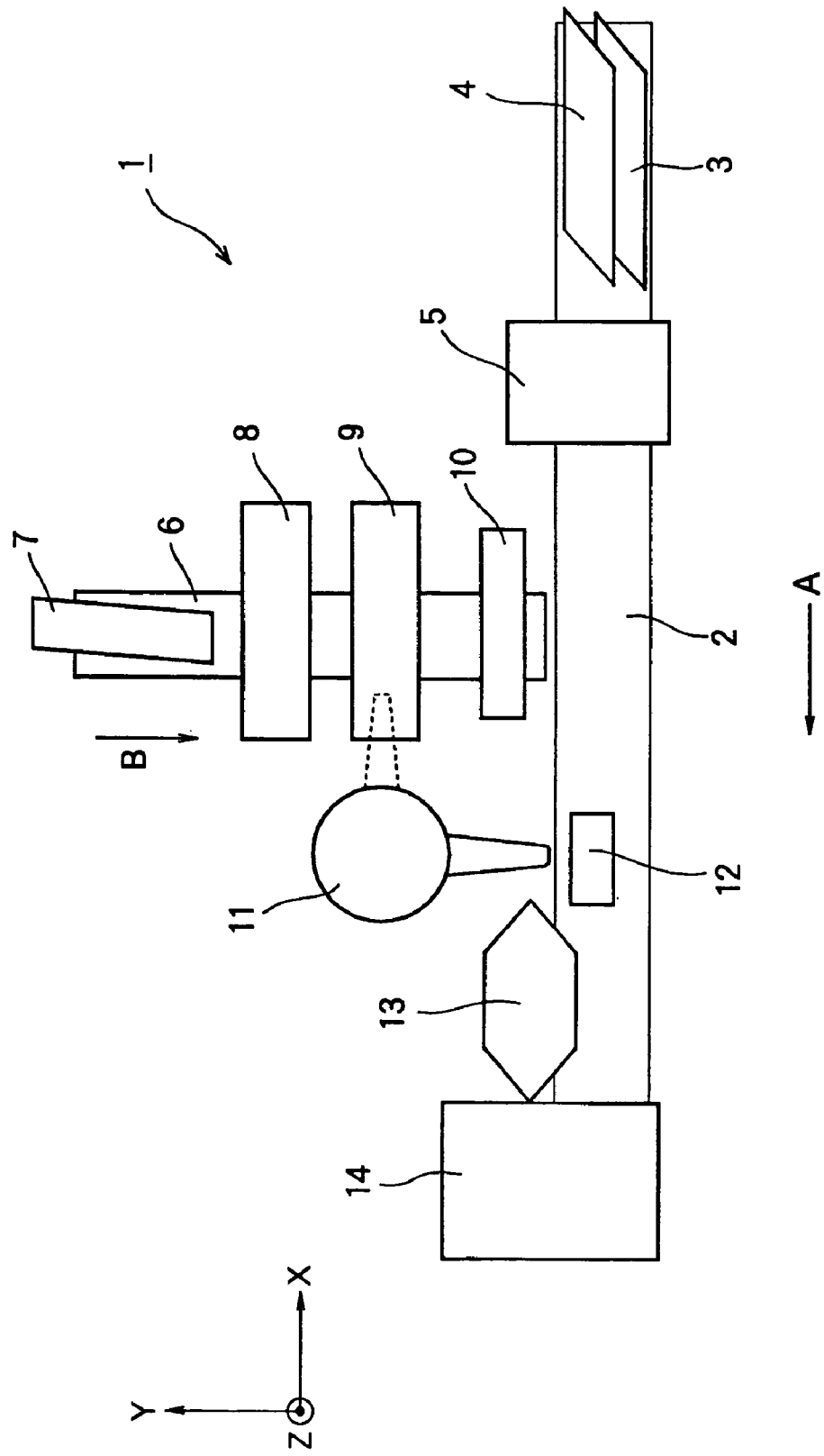
FIG. 1 is a schematic diagram of the overall configuration of a suspension-section assembling apparatus according to a first embodiment, for assembling a suspension section, in an HG assembly apparatus of the present invention.

FIG. 1 is a schematic diagram of the overall configuration of a suspension-section assembling apparatus for assembling a suspension according to a first embodiment, in an HG assembly assembling apparatus of the present invention. First, the overall flow of the assembly processes will be outlined by referring to the schematic diagram of FIG. 1, and the details of the respective processes will be described thereafter.

Figure 25:
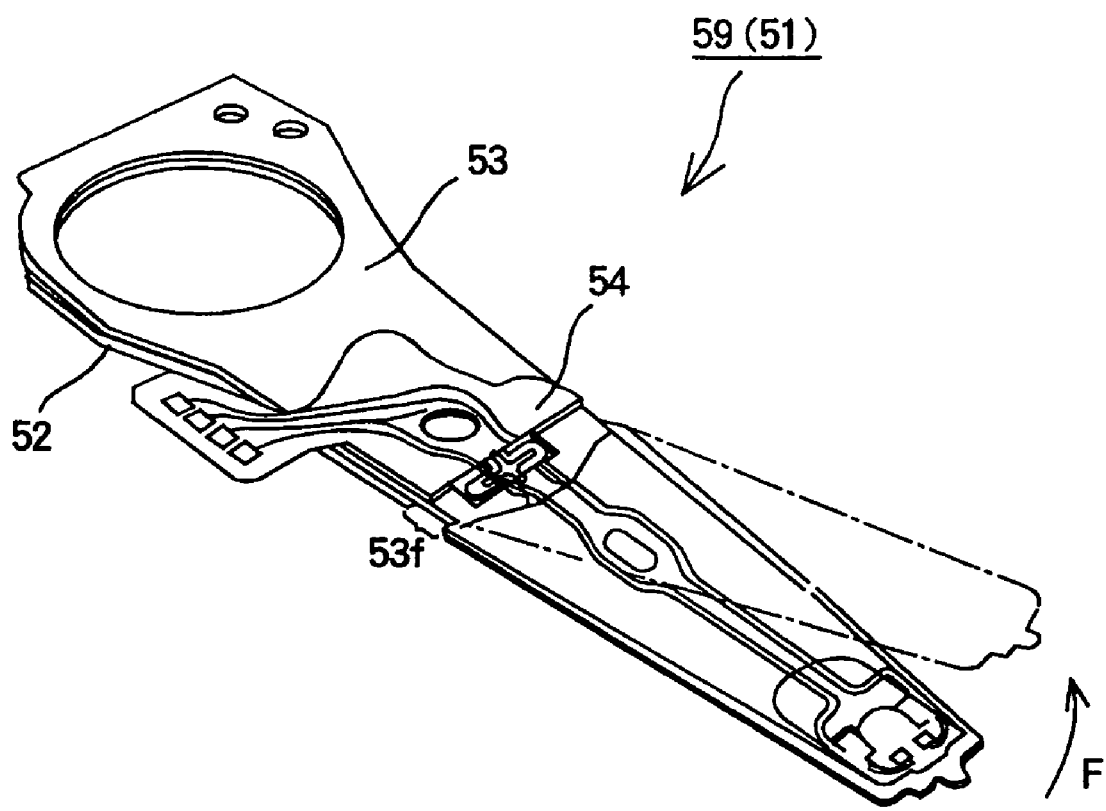
FIG. 25 is a perspective view showing the appearance of the HG assembly 51 (suspension section 59) before the slider is attached thereto.

In FIG. 1, a suspension-section assembling apparatus 1 assembles the suspension section 59 (in FIG. 25) corresponding to the HG assembly 51 before the slider 58 (in FIG. 26) is attached thereto, and a transfer system 2 transfers, in the direction of arrow A, a base plate series 3 (in FIG. 2(a)) and a load beam series 4 (in FIG. 2(b)) that have been stacked up. A bending device 5 bends the predetermined portions of the load beam 53 (in FIG. 26) by pressing.

As shown in FIG. 2(a), the base plate series 3 is formed by processing a stainless steel sheet into a desired shape by punching or etching. The base plate series 3 comprises a band portion 3a and a plurality of the base plates 52. The base plates 52 are in the form of a series and are integrated into the band portion 3a via connecting portions 3d formed in the band portion 3a at a predetermined series pitch P1. The load beam series 4 shown in FIG. 2(b) is also formed in the similar manner. The load beam series 4 comprises a band portion 4a and a plurality of the load beams 53. The load beams 53 are in the form of a series and are integrated into the band portion 4a via connecting portions 4d formed in the band portion 4a at the predetermined series pitch P1.

Conveying holes 3c serving as the first conveying holes and conveying holes 4c serving as the second conveying holes are formed in the band portion 3a serving as the first band portion and the band portion 4a serving as the second band portion, respectively. The conveying holes 3c and 4c are formed in the longitudinal direction at the series pitch P1.

Herein, a configuration where a plurality of the same members are integrated into a band portion, via connecting portions formed in the band portion in the longitudinal direction at a predetermined pitch in this manner will be referred to as a series.

Figure 7:
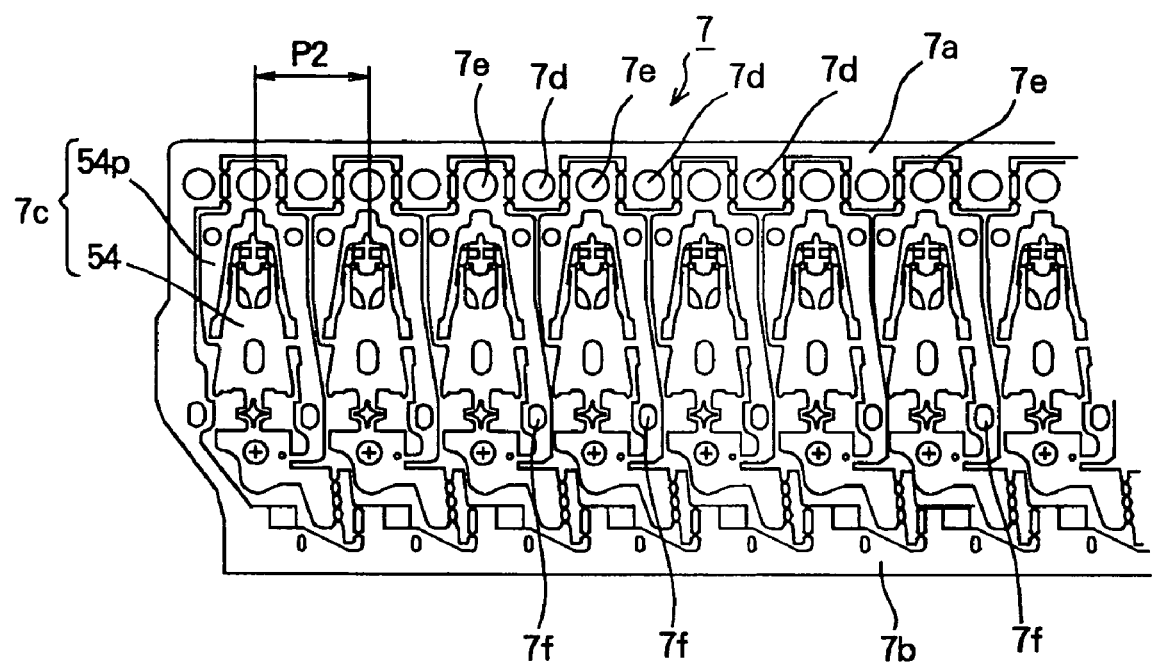
FIG. 7 is a top view showing the configuration of a flexure series.

A flexure series 7 to be described later is formed in the same manner, as shown in FIG. 7. The flexure series 7 comprises a first band portion 7a and a second band portion 7b disposed on both sides of the series, a plurality of the flexures 54 mutually adjacent to each other, frames 54p formed around the respective flexures 54. Herein, a single piece comprising the flexure 54 and the frame 54p joined together is referred to as a flexure piece 7c. The flexure 54 in FIG. 7 excludes the integral-type lead 55 (in FIG. 26) for quick and easy reference.

A flexure transfer system 6 transfers the flexure series 7 (in FIG. 7) in the direction of arrow B perpendicular to the direction of arrow A. The flexure-bending device 8 bends the predetermined portions of the flexure 54 (in FIG. 26) by pressing. A cutting device 9 cuts the transferred flexure series 7 into the flexure pieces 7c, and a transferring device 11 places each of the flexure pieces 7c on the predetermined position of the load beam 53 of the load beam series 4 (in FIG. 2(b)) transferred to a limiter-loading region 12, as will be described later.

A flexure-piece holding mechanism 13 transports the base plate series 52 and the load beam series 53 in a series state and the flexure pieces 7c as a single piece, stacked up in a three-layered state, to a predetermined position in a laser-welding device 14, in cooperation with the transfer system 2. The laser-welding device 14 spot-welds predetermined spots to be described later for joining, and then cuts off the frames 54p from the flexure pieces 7c to complete the suspension sections 59. In this stage, the suspension sections 59 remain in the series form.

The operation of the suspension-section assembling apparatus 1 was outlined by referring to the schematic diagram of FIG. 1. Now, the detailed configuration and operation of each of the components of the apparatus will be described.

Figure 3:
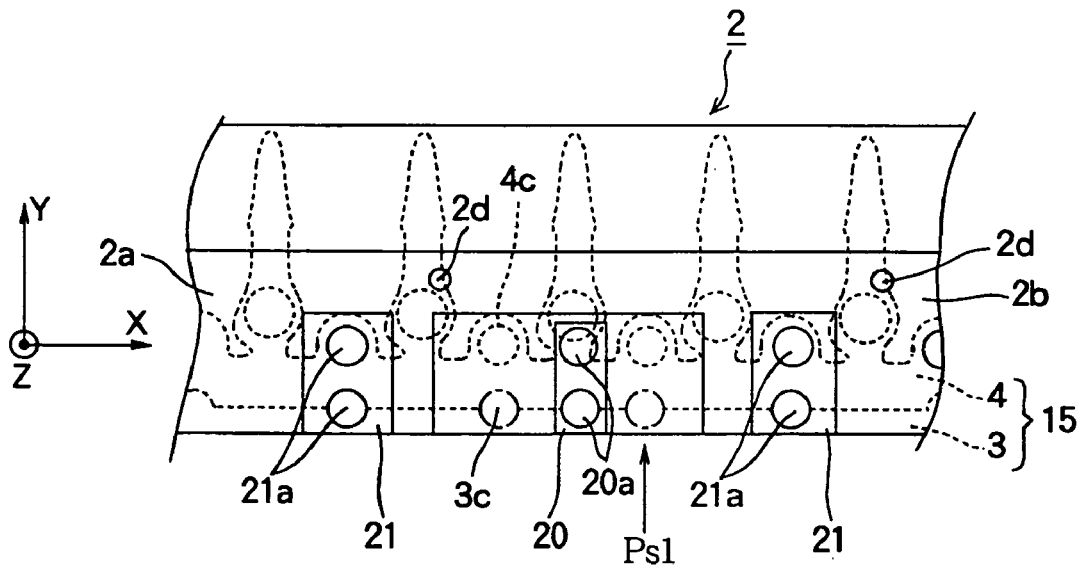
FIG. 3 is a partial top view showing the configuration of the pertinent part of a transfer system 2.
Figure 4:
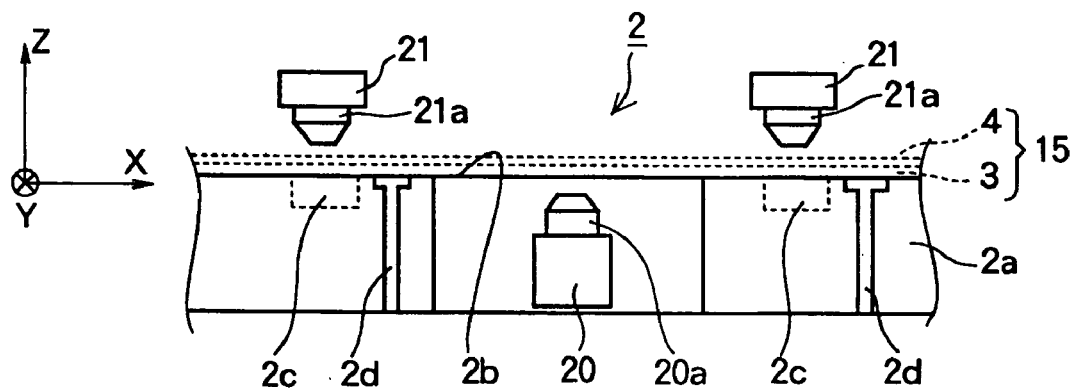
FIG. 4 is a partial front view showing the configuration of the pertinent part of the transfer system 2.
Figure 5:
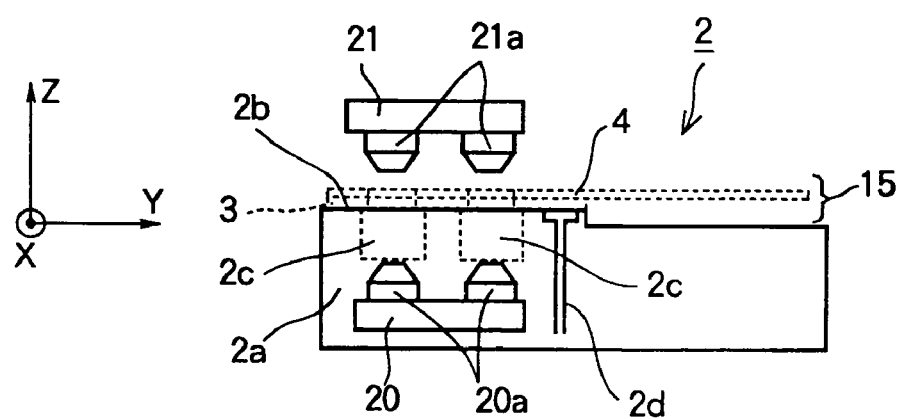
FIG. 5 is a side view showing the configuration of the pertinent part of the transfer system 2.

FIG. 3 is a partial top view showing the configuration of the pertinent part of the transfer system 2. FIG. 4 is a partial front view showing the configuration of the pertinent part of the same transfer system 2, and FIG. 5 is a side view showing the configuration of the pertinent part of the same transfer system 2. The coordinate axes illustrated in the drawings according to this embodiment show the directions for common use. The directions of arrows A and B shown in FIG. 1 are set to coincide with the negative directions of the X-axis and the Y-axis, respectively.

FIGS. 3 through 5 show the outlines of the base plate series 3 and the load beam series 4 stacked on a base-plate placing surface 2b in a stacked-up state, by dotted lines. The base-plate placing surface 2b is the top surface of a base-plate placing portion 2a of the transfer system 2. In this embodiment, the base plate series 3 and the load beam series 4, parts of which are shown in FIG. 2, are set to have a predetermined longitudinal dimension as long as 12 base plates 52 or 12 load beams 53 aligned.

Figure 2:
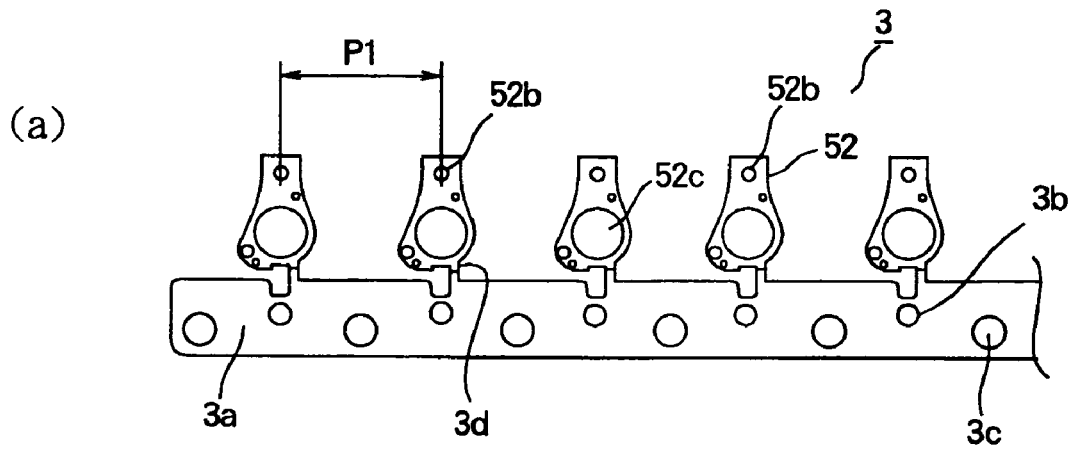
FIGS. 2a to 2c comprise drawings showing the configurations of a base plate series, load beam series, and a two-layered stacked series formed by stacking the load beam series on the base plate series.
Figure 2:
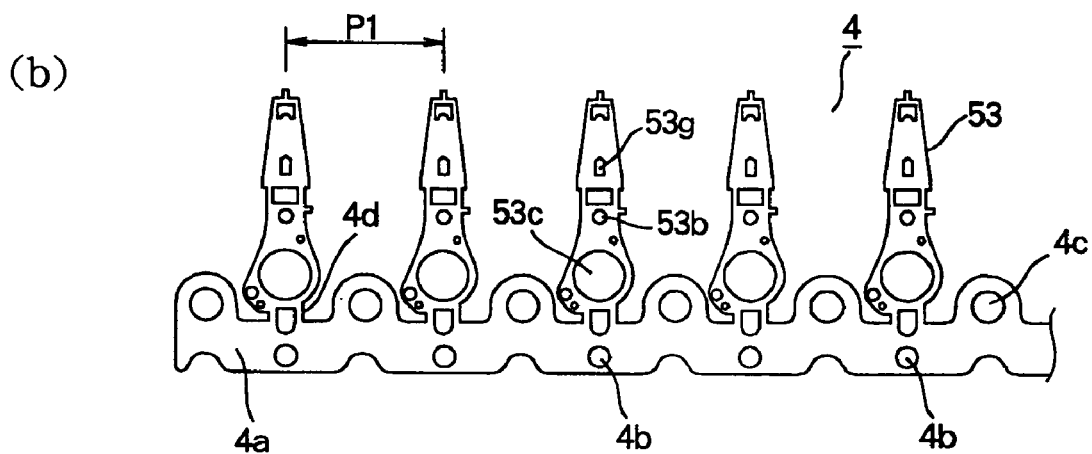
Figure 2:
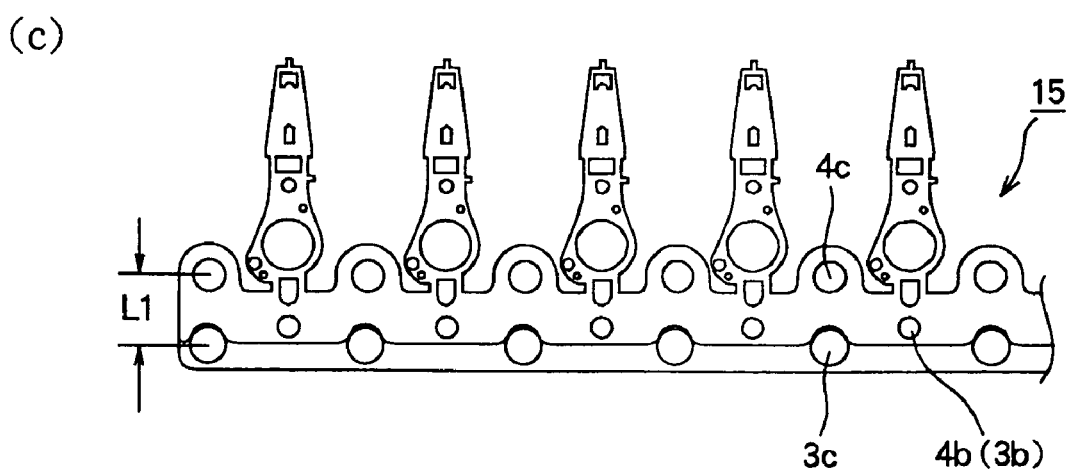

Further, as shown in FIG. 2, the common series pitch P1 is used for formation of the base plate series 3 and the load beam series 4, and positioning holes 3b and 4b are formed to have the same diameter. It is arranged that, when the positioning holes 3b and 4b are superimposed so as to coincide with each other, the base plates 52 and the load beams 53 are aligned to each other, as shown in FIG. 2(c). It is further arranged that conveying holes 3c and 4c formed in the base plate series 3 and the load beam series 4, respectively, at the series pitch P1 are aligned in the direction perpendicular to the longitudinal direction, being separated from each other by a distance L1.

Incidentally, herein, the base plate series 3 and the load beam series 4 stacked up in this way will be referred to as a two-layered stacked series 15. Further, herein, the state where the positioning holes 3b and 4b are aligned as described above will be referred to as a desired stacked state.

The transfer system 2 (in FIGS. 3 through 5) comprises a conveying block 20 in a drive mechanism therein, not shown. As will be described later, the conveying block 20 holds a pair of conveying pins 20a as first conveying pins. In order to move the two-layered stacked series 15 in the negative direction of the x-axis, the conveying pins are inserted into the conveying holes 3c and 4c of the two-layered stacked series 15 from beneath the base-plate placing surface 2b and slide along predetermined paths in the X-axis and Z-axis directions. The transfer system 2 also comprises a pressing block 21 in the drive mechanism not shown. The pressing block 21 holds a pair of suppression pins 21a. The suppression pins are displaced along the z-axis, in synchronization with the conveying pins 20a, and then they are inserted into the conveying holes 3c and 4c to press down the two-layered stacked series 15. Further, receiving slots 2c for receiving the suppression pins 21a are formed in the base-plate placing portion 2a.

Suction openings 2d are also formed in the base-plate placing portion 2a. When the two-layered stacked series 15 is in the rest position indicated by the dotted lines in FIG. 3(a) to be described later, the suction openings 2d suck the predetermined portions of the two-layered stacked series 15 with timing to be described later, so as to confine the movement of the two-layered stacked series 15.

These conveying block 20, pressing blocks 21, and suction openings 2d are disposed in a plurality of positions in the conveying path of the transfer system 2 from the upstream of the bending device 5 to the laser-welding device 14 shown in FIG. 1, so as to intermittently and sequentially transport a plurality of the two-layered stacked series 15 in the direction of arrow A by the conveyance operation to be described later.

Figure 6:
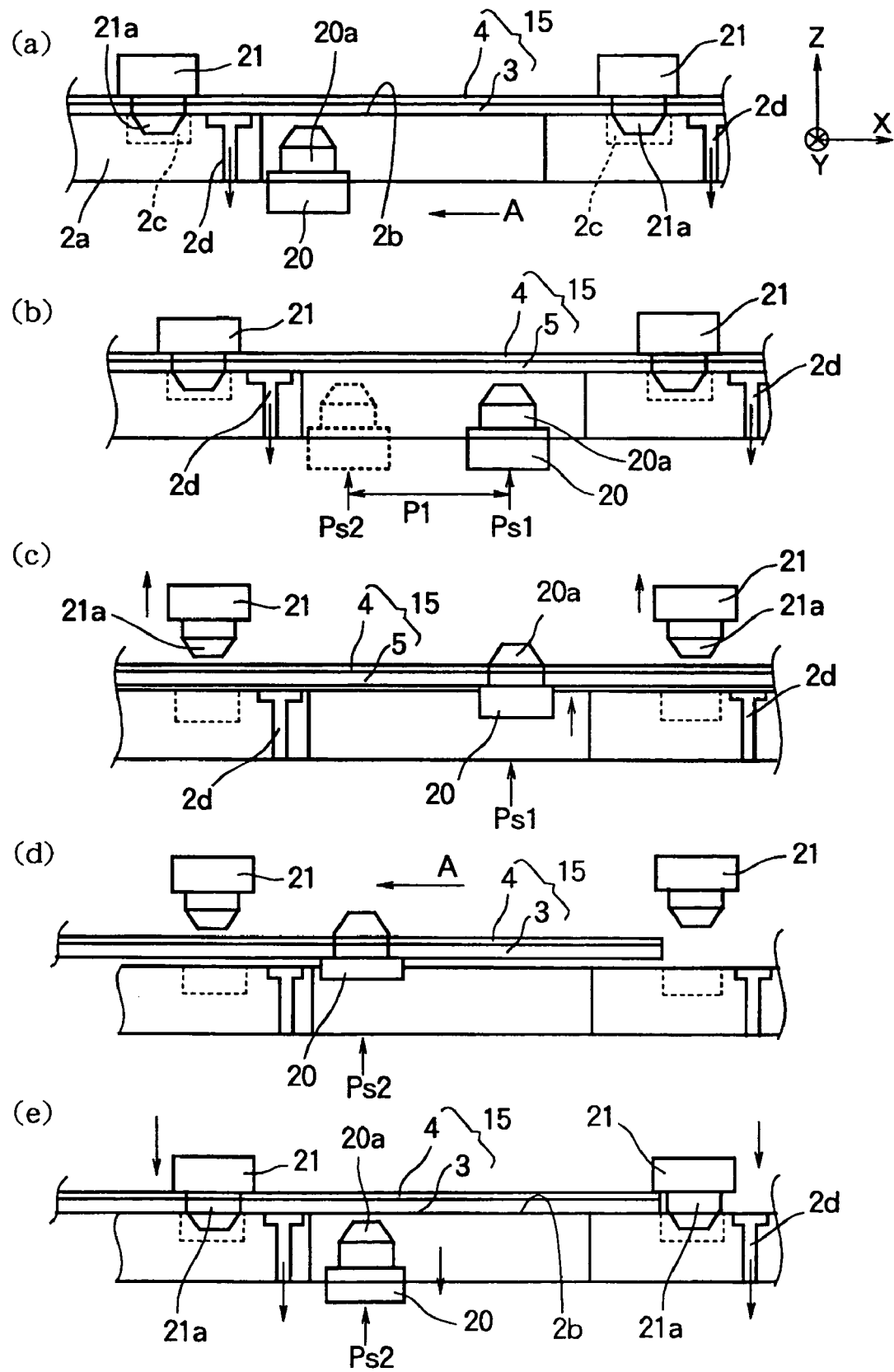
FIGS. 6a to 6e comprise operation diagrams for explaining the cyclic transference operation of the transfer system 2.

Next, the transference operation of the transfer system 2 will be described by referring to operation diagrams of FIG. 6. First, the two-layered stacked series 15 in which the load beam series 4 is superimposed on the base plate series 3, as shown in FIG. 2(c) is placed on the base-plate placing surface 2b of the transfer system 2 at the predetermined placing position in the upstream of the bending device 5 (in FIG. 1) by a worker or placement means not shown.

FIG. 6(a) shows the two-layered stacked series 15 at rest in the transferring cycle of intermittently transferring the two-layered stacked series 15 placed on the transfer system 2 in the direction of arrow A. In this case, the suppression pins 21a are inserted into the conveying holes 3c and 4c (in FIG. 2(c)) of the two-layered stacked series 15 to press the two-layered stacked series 15 against the base-plate placing surface 2b while keeping the two-layered stacked series 15 in the desired stacked state. Further, in this case, the suction openings 2d are brought into the state where air is drawn by suction means not shown, and sucks the opposed portions of the two-layered stacked series 15 to lock the series in place. The conveying pins 20a held in the conveying block 20, on the other hand, move downward, separating from the two-layered stacked series 15.

Then, as shown FIG. 6(b), the conveying block 20 underneath the two-layered stacked series moves in the positive direction of the X-axis with the pressing state of the suppression pins 21a and the suction state of the suction openings 2d maintained. In this case, the conveying block 20 moves just by the series pitch P1 (in FIG. 2) of the two-layered stacked series 15, and stops at an insertion position Ps1 (in FIG. 3) where the conveying pins 20a are placed directly below the conveying holes 3c and 4c (FIG. 2(c)) of the two-layered stacked series 15.

Next, as shown in FIG. 6(c), the conveying block 20 moves in the positive direction of the Z-axis, and the conveying pins 20a are inserted into the conveying holes 3c and 4c of the two-layered stacked series 15. Then, the conveying block 20 stops in the higher position in which the two-layered stacked series 15 is slightly lifted. In this case, the suction openings 2d cancel the suction state immediately before the conveying block 20 lifts the two-layered stacked series 15. The pressing blocks 21 then move in the positive direction of the Z-axis after the conveying pins 20a have reached the positions where they are inserted into the conveying holes 3c and 4c of the two-layered stacked series 15. Then, the pressing blocks 21 stop at retracted positions shown in FIG. 6(c) where the suppression pins 21a are separated from the two-layered stacked series 15. Switching from the suppression pins 21a to the conveying pins 20a, for being inserted into the conveying holes 3c and 4c, is thereby performed, without disturbing the desired stacked state of the two-layered stacked series 15.

Next, as shown in FIG. 6(d), the conveying block 20 in the higher position where the two-layered stacked series 15 has been pressed up slightly, moves in the negative direction of the X-axis just by the series pitch P1 to reach a release position Ps2. Thus, the two-layered stacked series 15 is transferred in the same direction or in the direction of arrow A just by the series pitch P1 with this movement, and adjacent right-hand conveying holes 3c and 4c of the two-layered stacked series 15 move to the positions directly below the suppression pins 21a.

Next, as shown in FIG. 6(e), the conveying block 20 moves in the negative direction of the Z-axis in this release position Ps2, to place the two-layered stacked series 15 again on the base-plate placing surface 2b. Then, the conveying block 20 further moves in the same direction to stop in the lower position described before. In this case, the suction openings 2d are brought into the suction state when the two-layered stacked series 15 is placed on the base-plate placing surface 2b, and the pressing blocks 21 move in the negative direction of the Z-axis. Then, while the conveying pins 20a are inserted into the conveying holes 3c and 4c of the two-layered stacked series 15, the suppression pins 21a are inserted into conveying holes 3c and 4c of the two-layered stacked series 15 immediately below the suppression pins 21a to press the two-layered stacked series 15 against the base-plate placing surface 2b again. The two-layered stacked series 15 is thereby brought into the state of rest shown in FIG. 6(a). Switching from the conveying pins 20a to the suppression pins 21a, for being inserted into the conveying holes 3c and 4c, can be thereby performed again without disturbing the desired stacked state of the two-layered stacked series 15.

As described above, the transfer system 2 keeps on the cyclic operation of transferring the two-layered stacked series 15 in the direction of arrow A just by the series pitch P1 in one cycle, thereby transferring the two-layered stacked series 15 in the direction of arrow A intermittently and sequentially from one assembly station to another.

Figure 26:
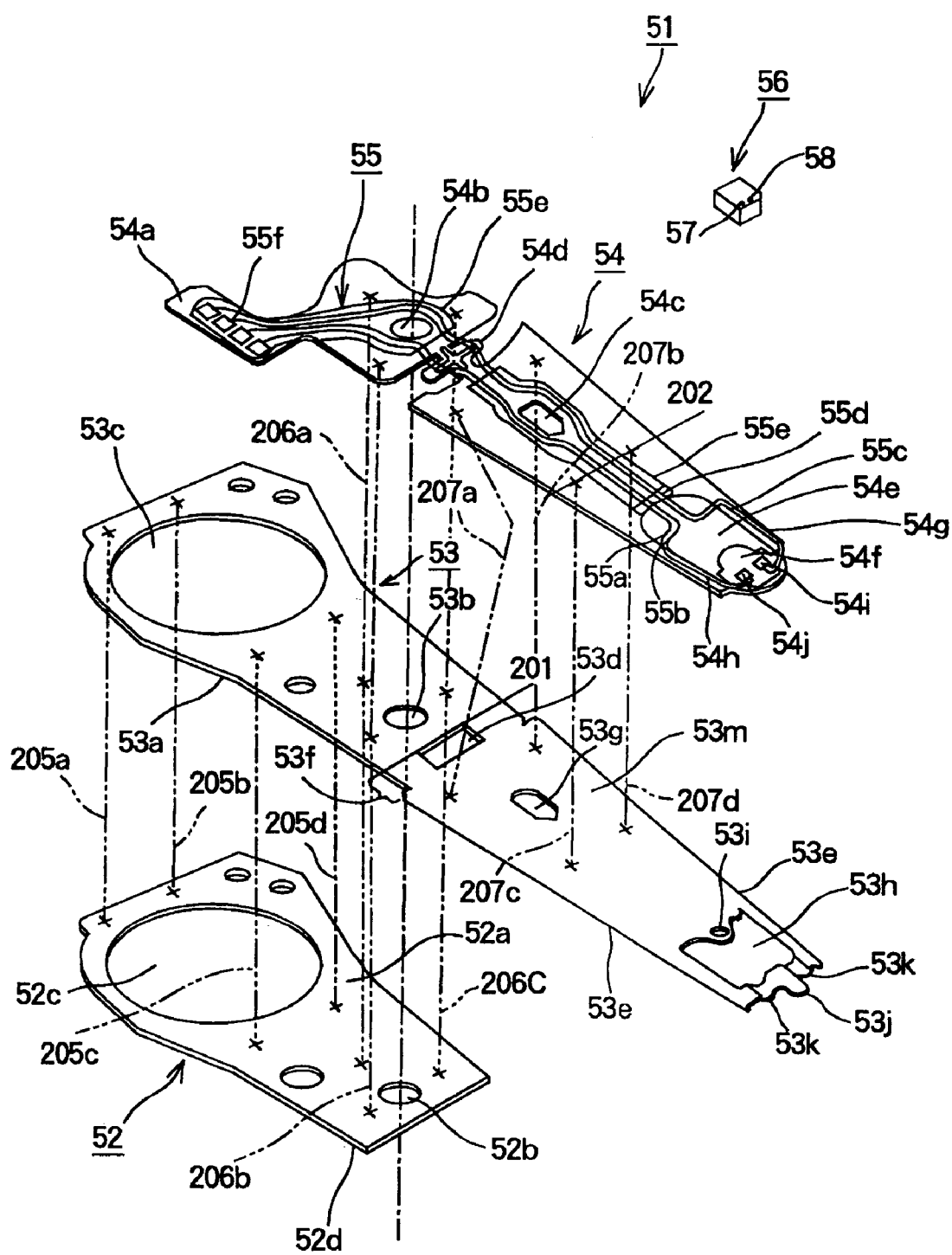
FIG. 26 is an exploded perspective view showing the configuration of the HG assembly 51.
Figure 27:
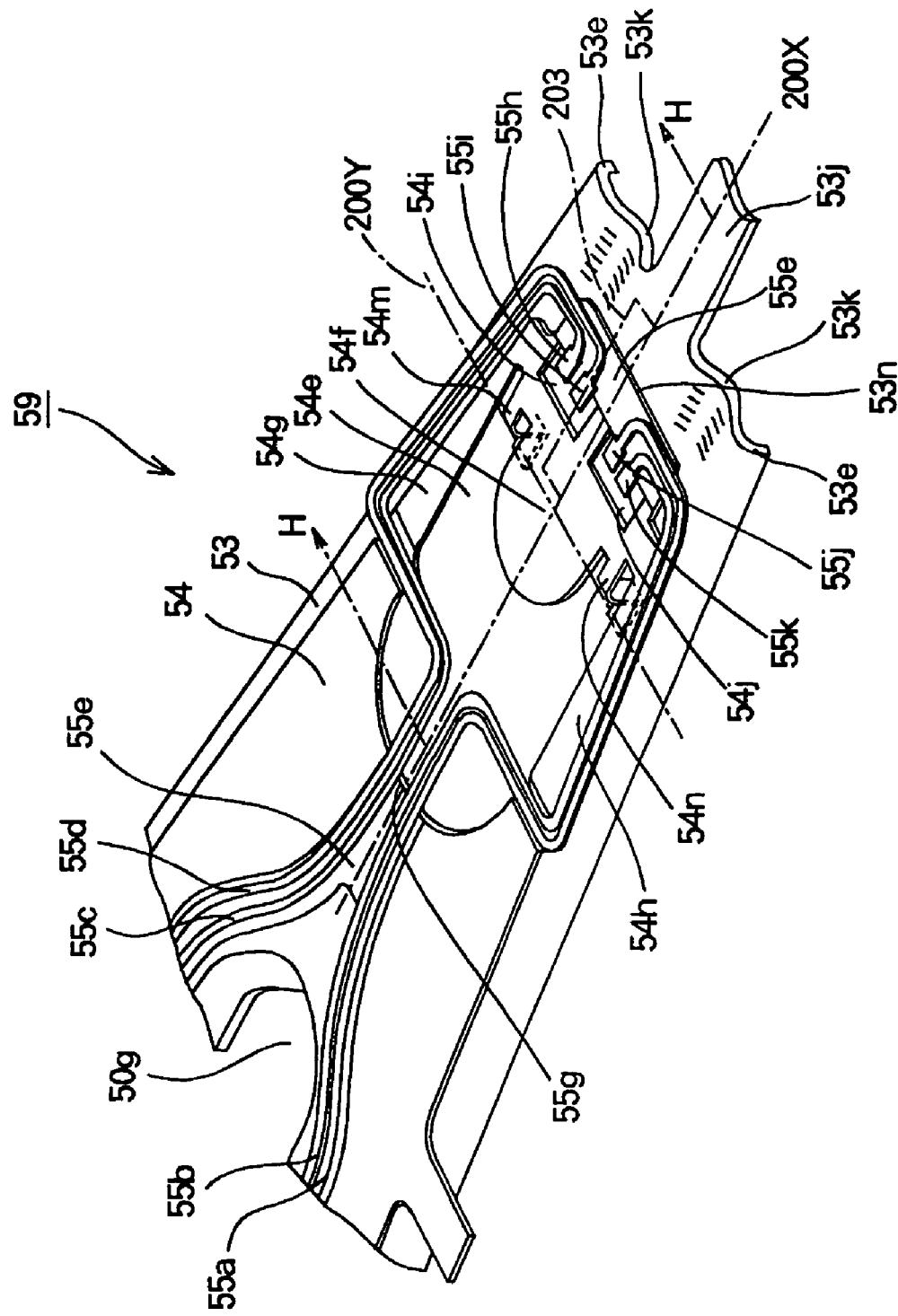
FIG. 27 is a partial expanded view of the leading end of the HG assembly 51 (suspension section 59) before the slider 56 is attached thereto.
Figure 28:
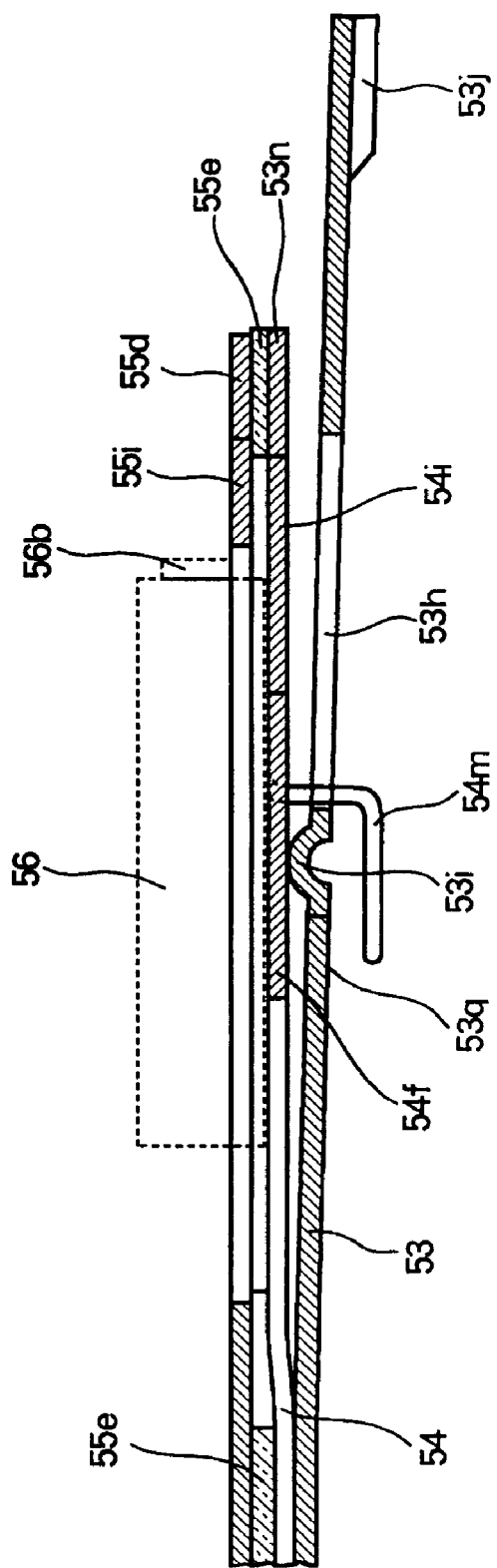
FIG. 28 is a sectional view of a position indicated by an indicator line 203 in FIG. 27, as seen from the direction of arrow H.
Figure 29:
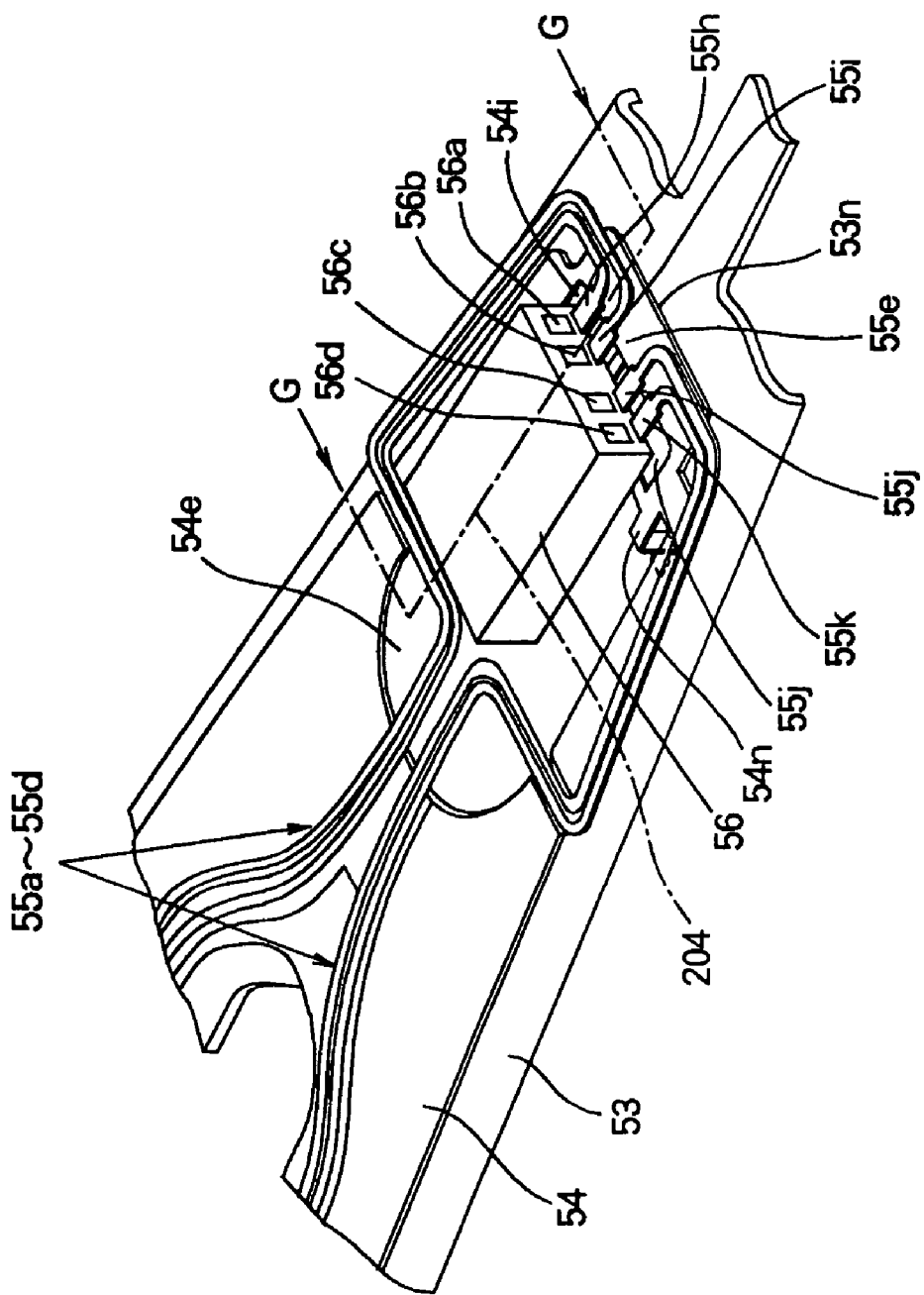
FIG. 29 is a perspective view showing the leading end of the HG assembly 51 in which the slider 56 is attached to a flexure tongue 54f.

While the two-layered stacked series 15 being transported sequentially by the cyclic transference operation of the transfer system 2 is in the state of rest in the cycle shown in FIG. 6(a), the bending device 5 (in FIG. 1) bends the predetermined portions of the load beam 53 transported to the processing position in the device. The flanges 53e (refer to FIG. 27), gimbal pivot 53i (refer to FIG. 28), and support 53k in the load beam 53 shown in FIG. 26 are bent at this time.

On the other hand, the flexure transfer system 6 in FIG. 1 transfers the flexure series 7 shown in FIG. 7 in the direction of arrow B or the negative direction of the Y-axis. Since its transference manner is just the same as that of the transfer system 2, its detailed description will be omitted. Conveying holes 7d into which the pins not shown, corresponding to the conveying pins 20a and the suppression pins 21a (in FIG. 5) are inserted are formed in the first band portion 7a of the flexure series 7.

The flexure series 7 comprises a plurality of the flexure pieces 7c formed adjacent to each other. In this embodiment, the longitudinal dimension of the flexure series 7 is set to be as long as 32 flexure pieces 7c aligned. Further, as shown in FIG. 7, the flexure pieces 7c are formed into a series, being separated from each other by a series pitch P2, and the conveying holes 7d are also formed at the series pitch P2.

The flexure transfer system 6 therefore keeps on the cyclic operation of transferring the flexure series 7 in the direction of arrow B just by the series pitch P2 in one cycle in the same manner as that with the transfer system 2 described before. The flexure series 7 is thereby transferred in the direction of arrow B sequentially.

Figure 8:
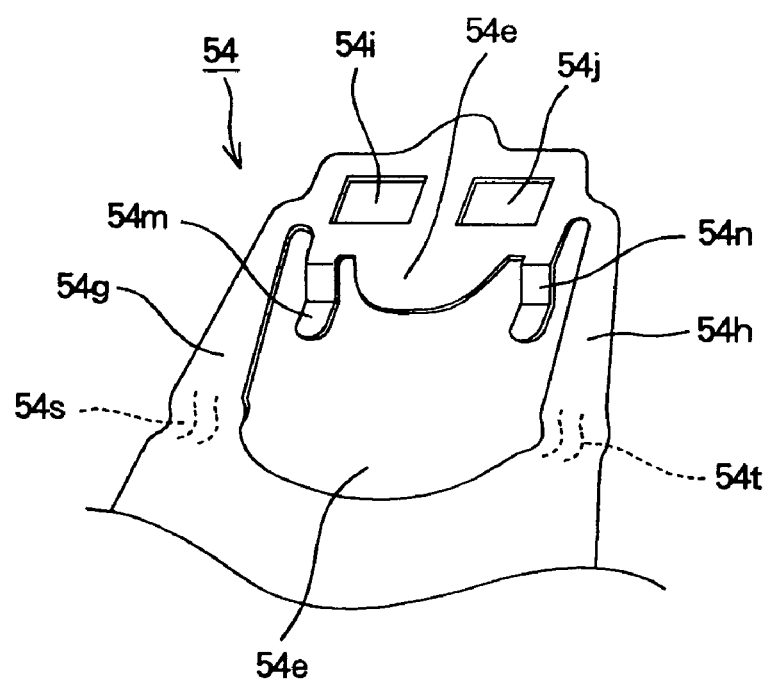
FIG. 8 is a partial perspective view showing a bent portion in a flexure to be processed by a flexure-bending device 8.

While the flexure series 7 being transported sequentially in the cyclic operation of the flexure transfer system 6 is in the state of rest of the cycle (corresponding to the state shown in FIG. 6(a)), the flexure-bending device 8 (in FIG. 1) bends the predetermined portions of the flexure 54 transported to the processing position in the device. The crank-shaped limiters 54m and 54n projected downward at the leading end of the flexure 54 and flexions 54s and 54t formed in the flexure arms 54g and 54h, respectively, shown in FIG. 8 are bent at this time.

Figure 9:
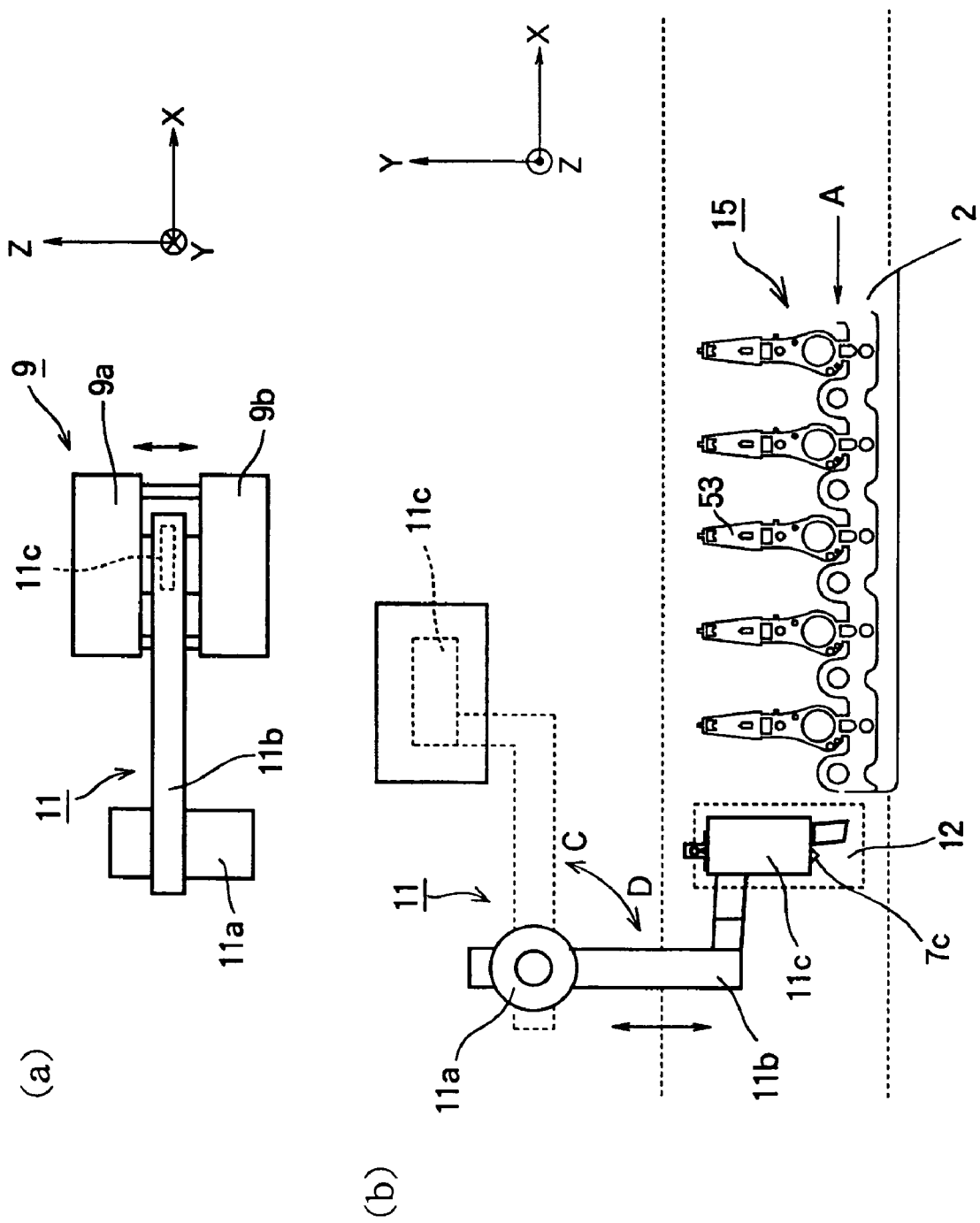
FIG. 9 comprises drawings view showing the pertinent part of a cutting device 9 and a transferring device 11 to be used in cooperation therewith.

The flexure series 7 that has undergone bending is transported to the cutting device 9. FIG. 9 is a drawing showing the configurations of the pertinent parts of the cutting device 9 and the transferring device 11 to be used in cooperation therewith. FIG. 9(a) shows a front view, while FIG. 9(b) shows a top view.

The cutting device 9 comprises a punch 9a and a die 9b disposed to face the upper side and lower side of the flexure series 7, respectively, that has been transported by the flexure transfer system 6. Blanking performed by pressure welding of these tools cuts and separates from the first band portion 7a and the second band portion 7b the flexure piece 7c of the flexure series 7 (in FIG. 7) transported to the predetermined cutting position between these tools and then held at rest. A disposal device 10 (in FIG. 1) cuts through and disposes of the unwanted first band portion 7a and the second band portion 7b transported as band portions after the flexure piece 7c has been blanked.

The transferring device 11 comprises a transferring arm 11b having a sucking pad 11c at its leading end and an arm-driving shaft 11a for rotating the transferring arm 11b in the directions of arrows C and D about the Z-axis and slightly displacing the sucking pad 11c in the directions of the Z-axis and the Y-axis.

Figure 15:
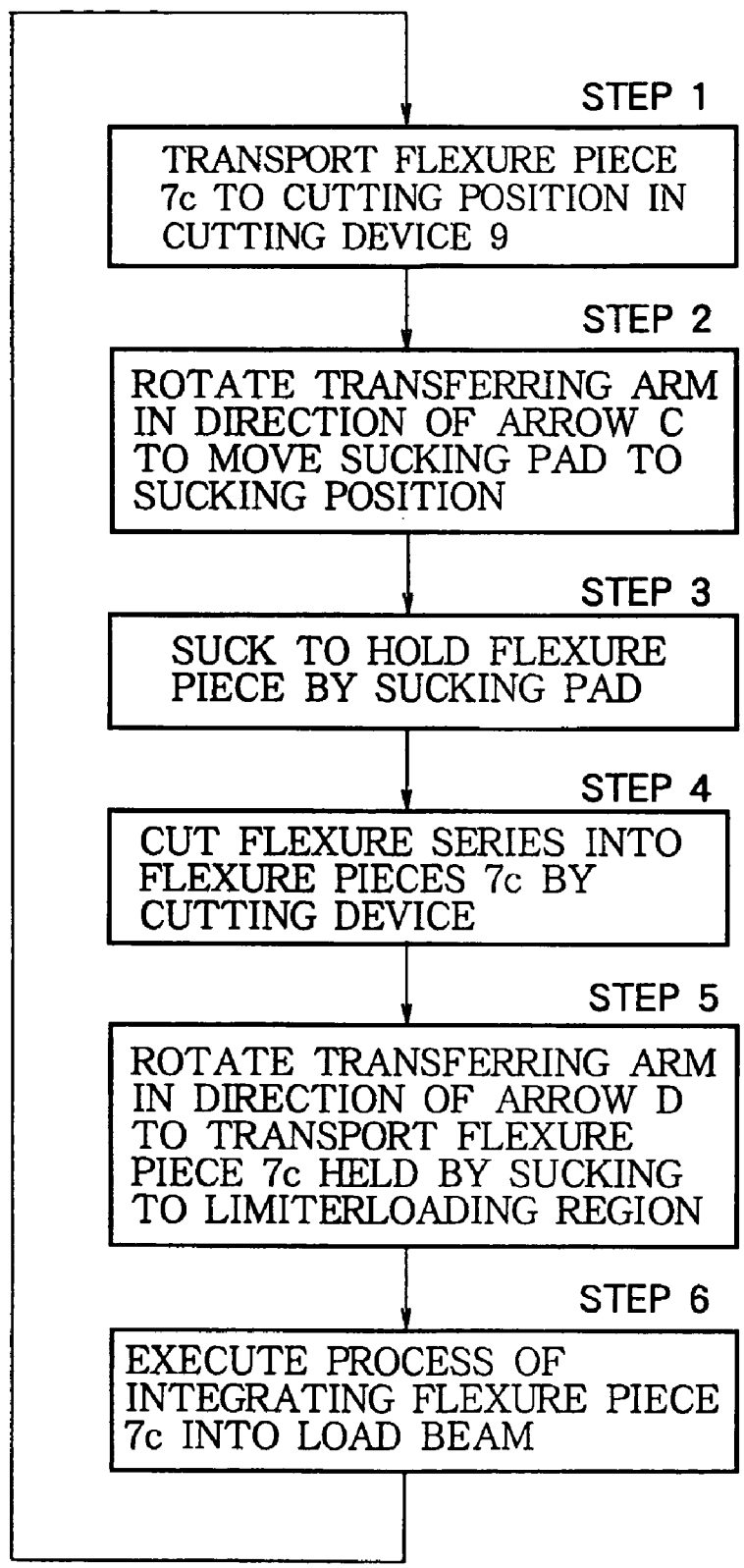
FIG. 15 is a flowchart showing a stacking process performed by the combined use of the transfer system 2, a flexure transfer system 6, the cutting device 9, and the transferring device 11.

The stacking procedures to be performed by the combined use of stacking means comprising the transfer system 2 as the first transfer portion, flexure transfer system 6 as the second transfer portion, cutting device 9, and transferring device 11 will be described by referring to a flowchart in FIG. 15.

First, a flexure piece 7c is transported to the cutting position in the cutting device 9 by the cyclic transference operation of the flexure transfer system 6 in step 1. At this point, the punch 9a and the die 9b of the cutting device 9 are detached, as will be described later. Next, in step 2, the transferring arm 11b is rotated in the direction of arrow C to move the sucking pad 11c at its leading end to a sucking position indicated by the dotted line in FIG. 9(b) where the pad faces the frame 54p of the flexure piece 7c in the cutting position.

Next, in step 3, the sucking pad 11c sucks the predetermined portion of the frame 54p of the flexure piece 7c to hold the flexure piece 7c. It is assumed that the sucking pad 11c has the shape that does not disturb the blanking operation of the cutting device 9 to be described later, though not shown.

Next, in step 4, the flexure piece 7c held by suction of the sucking pad 11c is cut out from the first band portion 7a and the second band portion 7b through blanking performed by pressure welding between the punch 9a and the die 9b of the cutting device 9. Then, in step 5, the transferring arm 11b is rotated in the direction of arrow D to a loading position indicated by the solid line in FIG. 9(b) from the sucking position so as to transport the flexure piece 7c held by sucking to the limiter-loading region 12.

As will be described later, an integration process is performed in step 6. In this process, the flexure piece 7c is stacked on the load beam 53 of the two-layered stacked series 15 (in FIG. 2(b)) that had been transferred by the transfer system 2 and then held at rest in the limiter-loading region 12. Then, as soon as this integration process has been performed, or in synchronization with this integration process, transference described in step 1 is performed, and operations from step 1 to step 6 are repeated.

Figure 10:
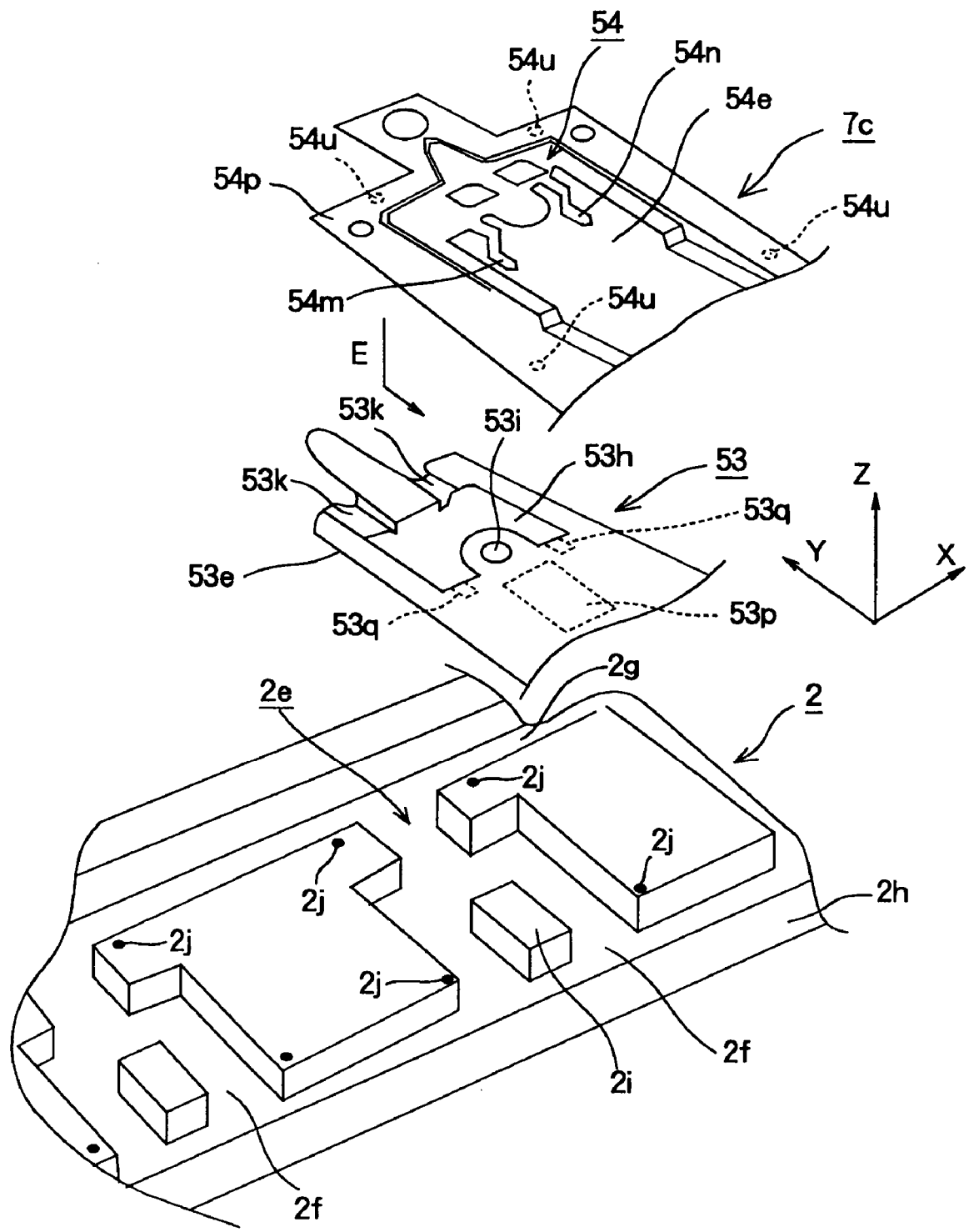
FIG. 10 is a partially exploded perspective view showing the partial configurations of the transfer system 2, a load beam 53, and a flexure piece 7c in the vicinity of a limiter-loading region 12 in which an integration process is performed.
Figure 11:
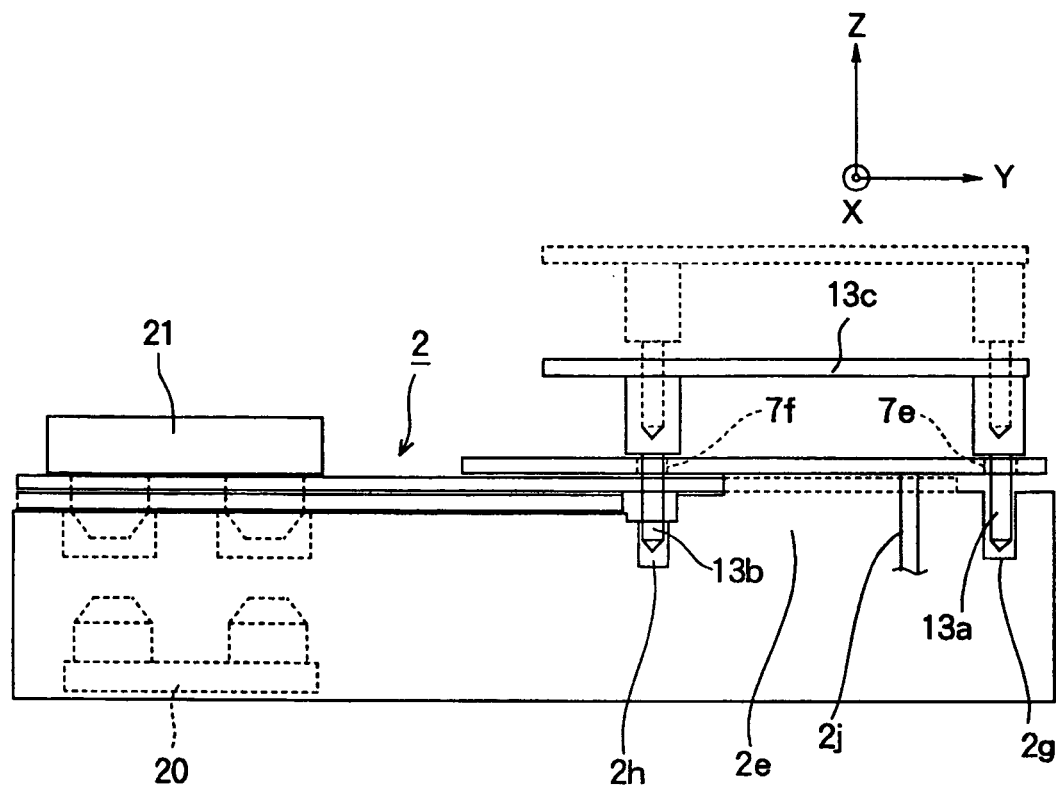
FIG. 11 is a side view showing the transfer system 2 and a flexure-conveying block 13c in a flexure-piece holding mechanism 13.

Next, the operation of the integration process in step 6 will be described. FIG. 10 is a partially exploded perspective view showing the partial configurations of the transfer system 2, load beam 53, and flexure piece 7c in the vicinity of the limiter-loading region 12 where the integration process is performed. FIG. 11 is a side view showing the transfer system 2 and the flexure-conveying block 13c of the flexure-piece holding mechanism 13 (in FIG. 1) in the transference path from the limiter-loading region 12 to the laser-welding device 14.

In the region of this transference path, a load-beam placing portion 2e is formed in the transfer system 2. Recessed areas 2f are formed in the load-beam placing portion 2e in the positions where the respective load beams 53 rest when the two-layered stacked series 15 is brought into the state of rest. The recessed area 2f accommodates the flanges 53e (refer to FIG. 27) and the support 53k of the load beam 53 that have been bent by the bending device 5. Long grooves 2g and 2h for receiving the leading ends of stepped pins 13a and 13b of the flexure-piece holding mechanism 13 (in FIG. 11) to be described later are formed in both sides of the load-beam placing portion 2e, along the X-axis.

When the load beam 53 is in this rest position in the limiter-loading region 12, the load beam 53 is positioned such that a convex portion 2i formed in the recessed area 2f of the transfer system 2 comes into contact with a contact region 53p (in FIG. 10) indicated by the dotted line, so that the flanges 53e (refer to FIG. 27) and the support 53k of the load beam 53 are accommodated in the recessed area 2f. The contact region is located in the vicinity of the opposite side of the gimbal pivot 53i of the load beam 53 remote from the opening 53h.

On the other hand, the transferring arm 11b holding the flexure piece 7c transports the flexure piece 7c to the limiter-loading region 12. At this point, a pair of the limiters 54m and 54n formed in the flexure 54 are set to be positioned over the opening 53h of the load beam 53. Then, the transferring arm 11b slightly displaces the flexure piece 7c in the negative directions of the Z-axis and the Y-axis as indicated by arrow E in FIG. 10. The leading ends of a pair of the limiters 54m and 54n are thereby moved to the predetermined positions where they can come into contact with the underside 53q of the load beam 53 (refer to FIG. 28) after having being passed through the opening 53h of the load beam 53.

At this point, four suction portions 54u indicated by dotted lines in the frame 54p of the flexure piece 7c in FIG. 10 face respective four suction openings 2j formed in the load-beam placing portion 2e to be suctioned, so that the flexure piece 7c is positioned on the load beam 53. At this stage, the flexure piece 7c is set free from the sucking pad 11c of the transferring arm 11b, so that the integration process in step 6 is completed.

Figure 12:
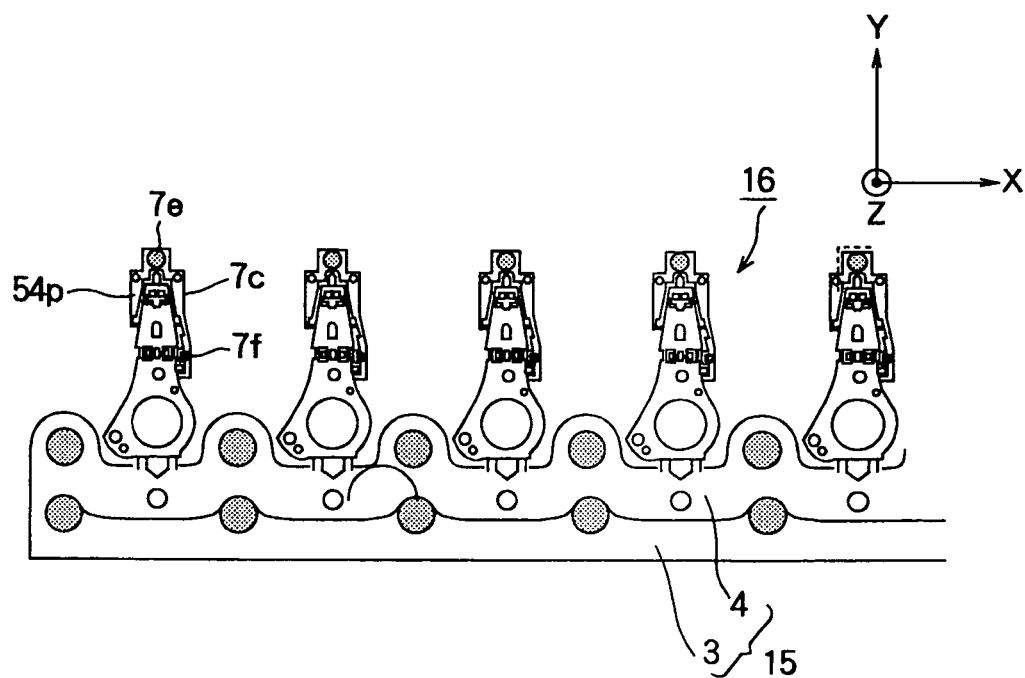
FIG. 12 is a top view of a three-layered stacked series formed by stacking on a two-layered stacked series 15 flexure pieces positioned on the respective load beams.

Next, the configuration of transferring the two-layered stacked series 15 and the flexure pieces 7c from the limiter-loading region 12 to the laser-welding device 14 (in FIG. 1) in a three-layered stacked state, as shown in FIG. 12 will be described. The two-layered stacked series 15 is in the desired stacked state, while the flexure pieces 7c are placed and positioned on the respective load beams 53 of the load beam series 4. Herein, the three-layered stacked series that comprises the two-layered stacked series 15 and the flexure pieces 7c will be referred to as a three-layered stacked series 16.

As described before, FIG. 11 is a side view of the transfer system 2 and the flexure-conveying block 13c in the stacked-layer-series transference region. In this region as well, the two-layered stacked series 15 is transferred by the cyclic transference operation described before and performed by the combined use of the conveying block 20 and the pressing block 21 that comprise a third transfer portion. On the other hand, the stepped pins 13a and 13b as the third conveyance pins of the flexure-piece holding mechanism 13 are disposed in the positions capable of being inserted into conveying holes 7e and 7f (in FIGS. 7 and 12), respectively. The conveying holes 7e and 7f are formed in the frames 54p of the flexure pieces 7c and serve as the third conveying holes. The number of the stepped pins 13a and 13b is made to be equal to the number of all the flexure pieces 7c in this stacked-layer-series transference region.

First, the flexure-conveying block 13c moves in the negative direction of the Z-axis so as to insert the stepped pins 13a and 13b into the conveying holes 7e and 7f of the flexure piece 7c that is at rest with the two-layered stacked series 15 after the integration process in step 6 is completed. The side view of FIG. 11 shows the state in which the flexure-conveying block 13c has completed this movement, and the transfer system 2 is in the state illustrated by FIG. 6(b) of the transference cycle shown in FIG. 6, or the state in which the conveying block 20 is in the standby position.

The operation of the flexure-piece holding mechanism 13 will be described with reference to the transference cycle of the transfer system 2 described in the explanation of the drawings in FIG. 6. Since the operation of the transfer system 2 is identical to that described before, a description will be given by focusing on the operation of the flexure-piece holding mechanism 13.

Next, as described in the explanation of FIG. 6(c), the conveying block 20 moves in the positive direction of the Z-axis to insert the conveying pins 20a into the conveying holes 3c and 4c of the two-layered stacked series 15. Then, the conveying block 20 stops in the higher position where the two-layered stacked series 15 is slightly lifted. At this point, the flexure-conveying block 13c also slightly moves upward by a distance that allows the flexure piece 7c placed on the two-layered stacked series 15 to be lifted upward with the two-layered stacked series 15. The four suction openings 2j that suck the frame 54p cancels its suction state immediately before the conveying block 20 lifts the two-layered stacked series 15.

Next, as described in the explanation of FIG. 6(d), the conveying block 20 moves in the negative position of the X-axis by the series pitch p1, so that the two-layered stacked series 15 is transferred in the same direction or direction of arrow A by the series pitch P1. With the movement of the conveying block 20, the flexure-conveying block 13c also moves together in the same direction, so that the flexure pieces 7c are transferred in the same direction without disturbing the stacking relationship between the two-layered stacked series 15 and the flexure piece 7c.

Next, as described in the explanation of FIG. 6(e), the conveying block 20 moves to the lower position along the Z-axis, where the pressing blocks 21 press the two-layered stacked series 15 against the base-plate placing surface 2b again. The two-layered stacked series 15 is thereby brought into the state of rest shown in FIG. 6(a). Then, when the flexure piece 7c is brought into contact with the load-beam placing portion again, the four suction openings 2j that suck the frame 54p are brought to the suction state to fix the flexure piece 7c. Thereafter, in synchronization with the downward movement of the conveying pins 20a, the flexure-conveying block 13c is moved upward so as to move the stepped pins 13a and 13b to the positions (indicated by the dotted line in FIG. 11) where they are separated from the conveying holes 7e and 7f of the flexure piece 7c, respectively.

Then, as described in the explanation of FIG. 6(b), the conveying block 20 in the lower position moves to the insertion position Ps1 (in FIG. 3) to stop. With the movement of the conveying block 20, the flexure-conveying block 13c also moves together in the same direction by the series pitch P1 (in FIG. 2) for the two-layered stacked series 15. Then, the flexure-conveying block 13c stops in the insertion position in which the stepped pins 13a and 13b are directly above the conveying holes 7e and 7f of the subsequent flexure piece 7c.

Incidentally, FIG. 11 shows the state in which the flexure-conveying block 13c moves downward to insert the stepped pins 13a and 13b into the conveying holes 7e and 7f of the flexure piece 7c, respectively, for positioning. This state is brought about in the course of the operation that proceeds from the step in FIG. 6(b) to the step in FIG. 6(c), before the conveying pins 20a are inserted into the conveying holes 3c and 4c of the two-layered stacked series 15, respectively.

The transfer system 2, in cooperation with the flexure-piece holding mechanism 13, continues the cyclic transference operation of transferring the three-layered stacked series 16 in the direction of arrow A by the series pitch P1 in one cycle. The stacking relationship between the two-layered stacked series 15 and the flexure piece 7c would not be therefore disturbed, so that they are transferred in the direction of arrow A sequentially from one assembly station to another. The transfer system 2, flexure-piece holding mechanism 13, and load-beam placing portion 2e in the stacked-layer-series transference region correspond to the first transfer means.

Figure 13:
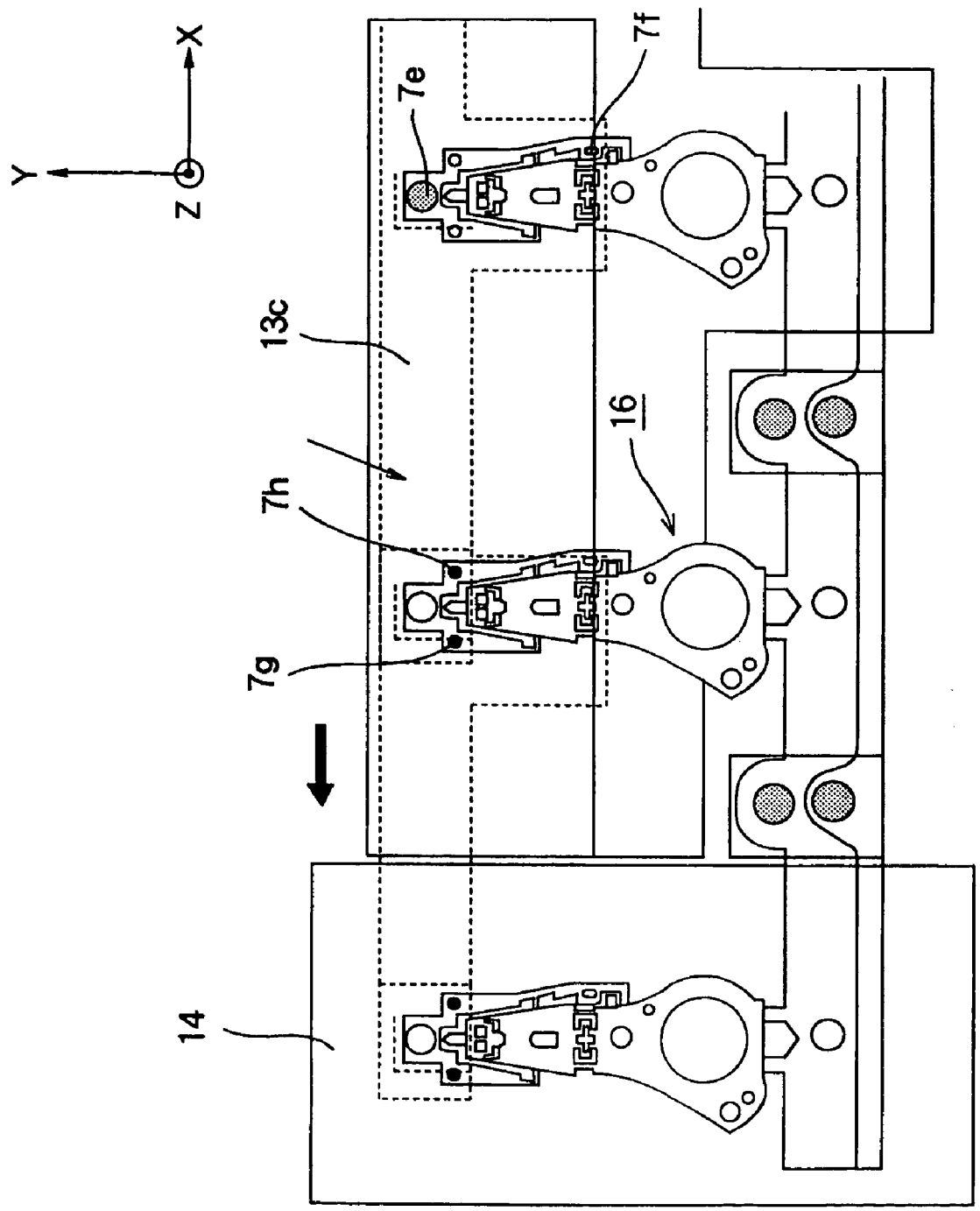
FIG. 13 is a top view showing a state where a three-layered stacked series 16 transferred to a laser-welding device 14 is further transported to the inside of the laser-welding device 14.

FIG. 13 shows the state of the three-layered stacked series 16 transferred to the laser-welding device 14 in the manner described above, before being further transported to the inside of the laser-welding device 14. The holes of the flexure piece 7c to be used by the flexure-conveying block 13c are switched from the conveying holes 7e and 7f to auxiliary holes 7g and 7h.

Figure 14:
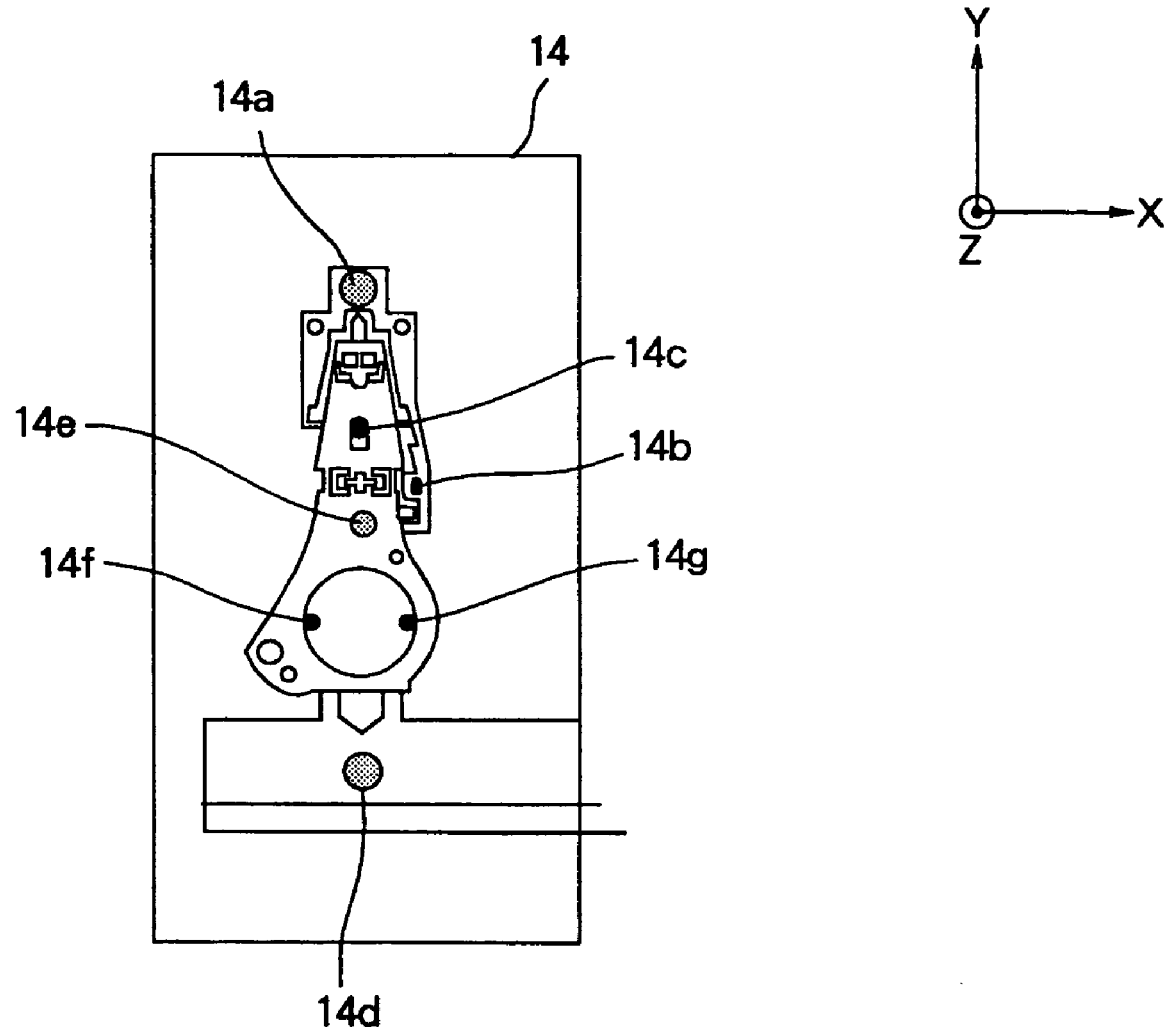
FIG. 14 is a top view showing a position where the three-layered stacked series 16 transferred to a rest position within the laser-welding device 14 is positioned by positioning pins.

FIG. 14 is a top view showing the position where the three-layered stacked series 16 transferred to the rest position inside the laser-welding device 14 is positioned by a plurality of positioning pins projecting upward from underneath the placing portion of the series.

The laser-welding device 14, as stacking-and-joining means, irradiates a laser beam onto the predetermined portions of the base plate 52, load beam 53, and flexure 54 stacked up in the three-layered stacked series 16 placed in the state of rest in the predetermined position of the device, to perform spot welding. Thus, for accurate positioning of the respective members before performing the spot welding, the laser-welding device 14 positions the respective members by using a plurality of positioning pins 14a to 14g projecting from underneath the placing surface of the three-layered stacked series 16 held at rest.

The positioning pins 14a and 14b are respectively inserted into the conveying holes 7e and 7f formed in the frame 54p of the flexure piece 7c, to position the flexure 54. The positioning pins 14c and 14d are respectively inserted into the guide opening 53g of the load beam and the positioning hole 4b of the load beam series 4 shown in FIG. 2(b), to position the load beam 53. The positioning pins 14e, 14f, and 14g are inserted into the reference opening 52b and the opening 52c of the base plate 52, shown in FIG. 2(a) to position the base plate 52.

Two-dot chain lines 205, 206, and 207 shown in FIG. 26 connect the spots to be joined by the laser radiation to show the positions where the respective members are joined together. The load beam 53 is joined to the base plate 52 at four spots indicated by the indicator lines 205a to 205d, the flexure 54 is joined to the load beam 53 at four spots indicated by the indicator lines 207a to 207d, and the base plate 52, load beam 53, and flexure 54 are joined together at three spots indicated by the indicator lines 206a to 206c. In this way, the laser-welding device 14 performs laser spot-welding to join the base plate 52, load beam 53, and flexure 54 positioned by the positioning pins 14a to 14g at 11 spots in total while the three-layered stacked series 16 is in the state of rest. The suspension section 59 is thereby formed by a combination of the base plate 52, load beam 53, and flexure 54.

Figure 16:
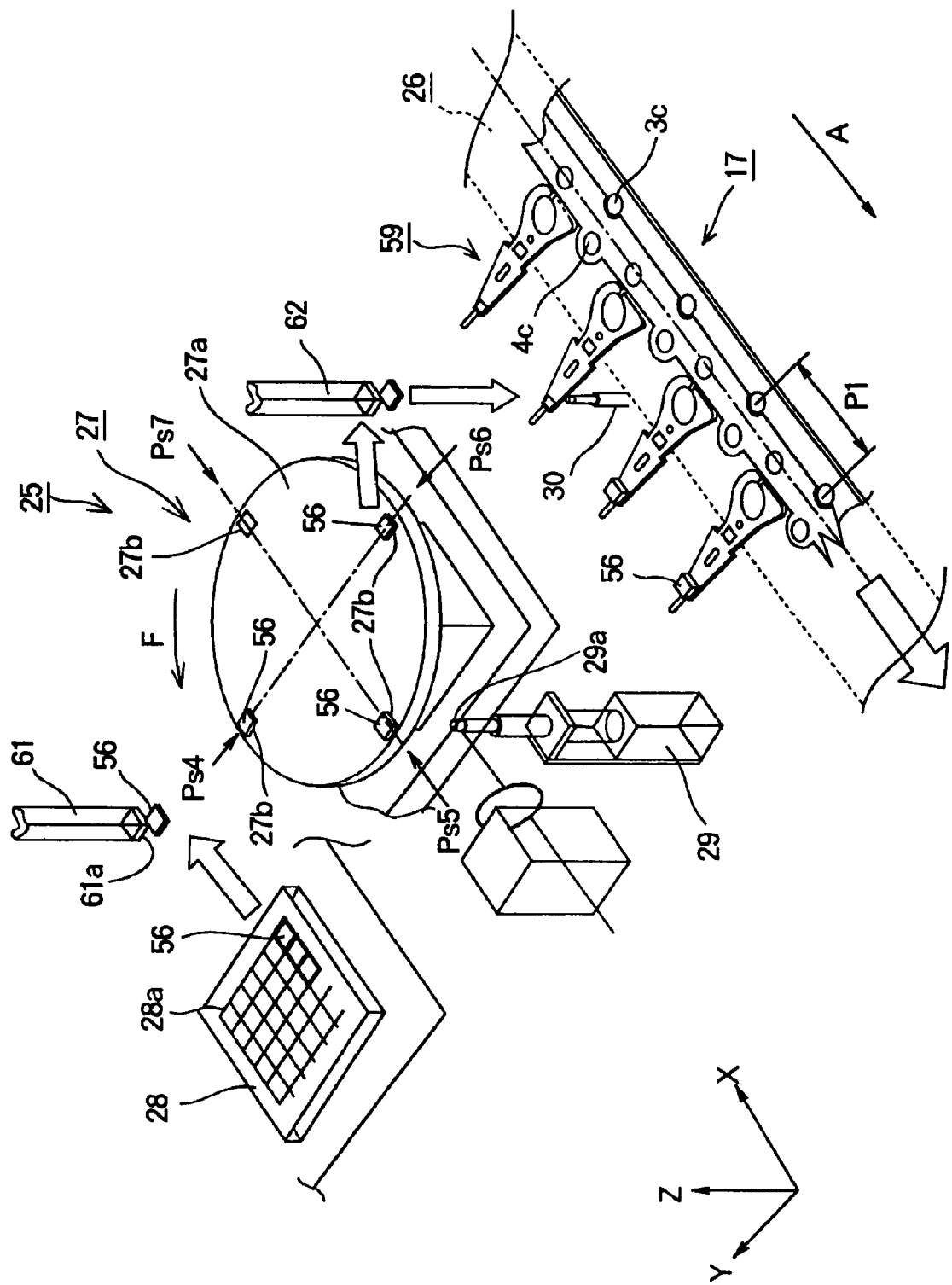
FIG. 16 is a perspective view showing the configuration of the pertinent part of a slider attacher according to a second embodiment, for attaching a slider to a suspension section 59 in a suspension series 17, in the HG assembly of the present invention.

Herein, a series of the suspension sections 59 formed by joining the predetermined spots of the three-layered stacked series 16 by the stacking-and-joining process will be referred to as a suspension series 17 (in FIG. 16).

As described above, according to the suspension-section assembling apparatus 1 of the first embodiment, the base plate 52, load beam 53, and flexure 54 can be provided in the series state and can be transferred in the series state for the respective processes to allow assembly of the suspension section. For this reason, trays or assembling blocks as the assembling jigs, on which suspension sections to be assembled should be mounted, become unnecessary for the respective processes.

Second Embodiment

FIG. 16 is a perspective view showing the configuration of the pertinent part of a slider attacher according to a second embodiment, in the HG assembly assembling apparatus of the present invention. The slider attacher attaches a slider to the suspension section 59 of the suspension series 17 assembled by the suspension section assembling device 1 described before.

Referring to FIG. 16, a transfer system 26 that comprises a slider attacher 25 as the second transfer means, indicated by the dotted line, includes a transference mechanism that is identical to the mechanism of the transfer system 2 described before. Thus, the transfer system 26 continues the cyclic operation of transferring the suspension series 17 by the series pitch P1 in the direction of arrow A in one cycle. This cycle is identical to the transference cycle of the transfer system 2 that uses the conveying holes 3c and 4c of the suspension series 17, shown in FIG. 2. For this reason, a detailed description of the transfer system 26 will be omitted. Incidentally, it is assumed herein that the frame 54p that has become unnecessary is removed from the flexure 54 in the suspension series 17 to be transferred by the transfer system 26, by the processing means not shown.

The negative direction of the X-axis in FIG. 16 is set to coincide with the arrow A, and the Y-axis is set to be parallel with the plane including the suspension series 17 to be transferred by the transfer system 26. The coordinate axes in the drawings in this embodiment show the directions for common use.

Figure 17:
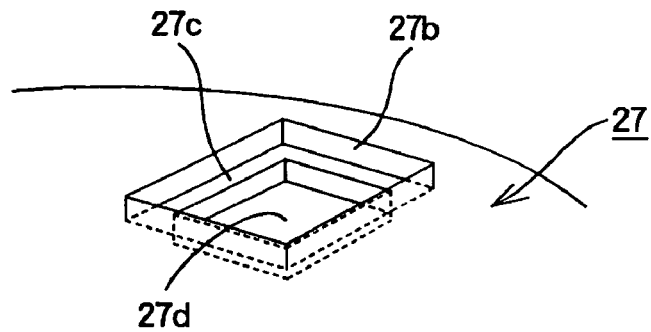
FIG. 17 is a partially expanded view of area near a slider-holding recess 27b.

A table unit 27 rotates a table 27a disposed on an X-Y plane in the direction of arrow F about the Z-axis, with timing to be described later. Four slider-holding recesses 27b for receiving and holding the sliders 56 are formed near the edges of the top surface of the table 27a, and are formed in such positions that the table is divided into four equal parts. FIG. 17 is a partially expanded view showing an area near the slider-holding recess 27b. The slider-holding recess 27b, as shown in FIG. 17, is divided into two parts; a stepped portion 27c for placing peripheral part of the bottom of the slider 56 and a through hole 27d that passes from the edges of the stepped portion 27c through the underside of the table 27a.

A plurality of cells 28a in a lattice arrangement for holding the sliders 56 is formed in the top surface of a slider-holding tray 28. The slider-holding tray is disposed in a predetermined position near the table unit 27.

A suspension-fixing jig 30 is disposed below the tip of the suspension section 59 in the suspension series 17 transferred by the transfer system 26. The suspension-fixing jig moves upward when the sequentially transferred suspension section 59 has been brought into the state of rest in a predetermined rest position, and supports the portion near the flexure tongue 54f of the flexure 54 (in FIG. 27) to temporarily fix the suspension section 59.

A collet 61 performs a slider-transfer operation: it sucks a slider 56 placed on a cell 28a of the slider-holding tray 28 onto its leading end 61a, transfers the slider to the slider-holding recess 27b in a slider-placing position Ps4 of the table 27a, and then cancels suction.

An adhesive applicator 29 is disposed below the table 27a. It is disposed in such a position that the center of the adhesive injection from a tip 29a of the applicator coincides with the center of the opening 27d in the slider-holding recess 27b in an adhesive-applying position Ps5 rotated through 90 degrees from the slider-placing position Ps4. The adhesive applicator 29 injects an adhesive with the timing to be described later.

A collet 62, on the other hand, sucks a slider 56 in a slider-release position Ps6 rotated 180 degrees from the slider-placing position Ps4. The collet 62 carries the slider 56 to a predetermined attaching position on the flexure tongue 54f (in FIG. 27) fixedly supported by the suspension fixing jig 30 to press the slider against there, and then cancels suction. As described before, the predetermined attaching position is the one in which, when attaching the slider 56 to the flexure tongue 54f, the center of the slider 56 is generally superimposed over the contact point between the flexure tongue 54f and the gimbal pivot 53i, as shown in the broken line in FIG. 28. Incidentally, the table unit 27, slider-holding tray 28, suspension-fixing jig 30, adhesive applicator 29, and collets 61 and 62 comprise slider attaching means.

Now, a description will be directed to the overall operation of the slider attacher 25 having the above-mentioned configuration of the components. The table 27a rotates through 90 degrees in one cycle, in synchronization with the transference cycle of the transfer system 26. The table 27a is controlled such that, when a suspension section 59 is brought into the state of rest, the table 27a comes to rest in the positions where the slider-holding recesses 27b are opposed to the positions Ps4 to Ps6, respectively.

During the rest period, the collet 62 performs the slider-transfer operation described before. The adhesive applicator 29 applies the adhesive to the underside or the attaching surface of a slider 56 placed in a slider-holding recess 27b in the adhesive-applying position Ps5, via the through hole 27d. The collet 62 sucks a slider 56 in the slider release position Ps6, to which the adhesive has been applied, and carries the slider 56 to the before-mentioned, predetermined attaching position over the flexure tongue 54f fixedly supported by the suspension-fixing jig 30, for attachment.

Figure 18:
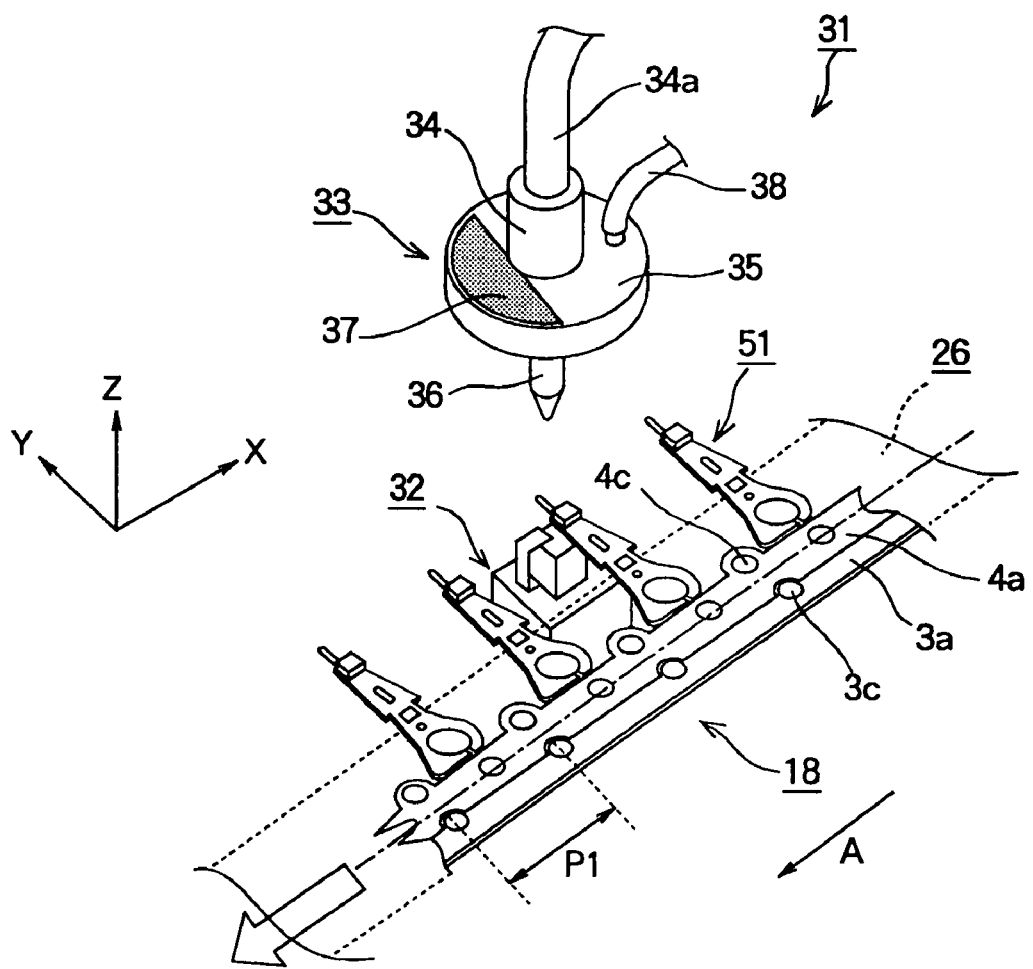
FIG. 18 is a perspective view showing the configuration of the pertinent part of a solder-ball bonding unit according to a third embodiment, for electrically connecting a slider 56 in an HG assembly series 18 to an integral-type conducting lead 55, in the HG assembly apparatus of the present invention.
Figure 19:
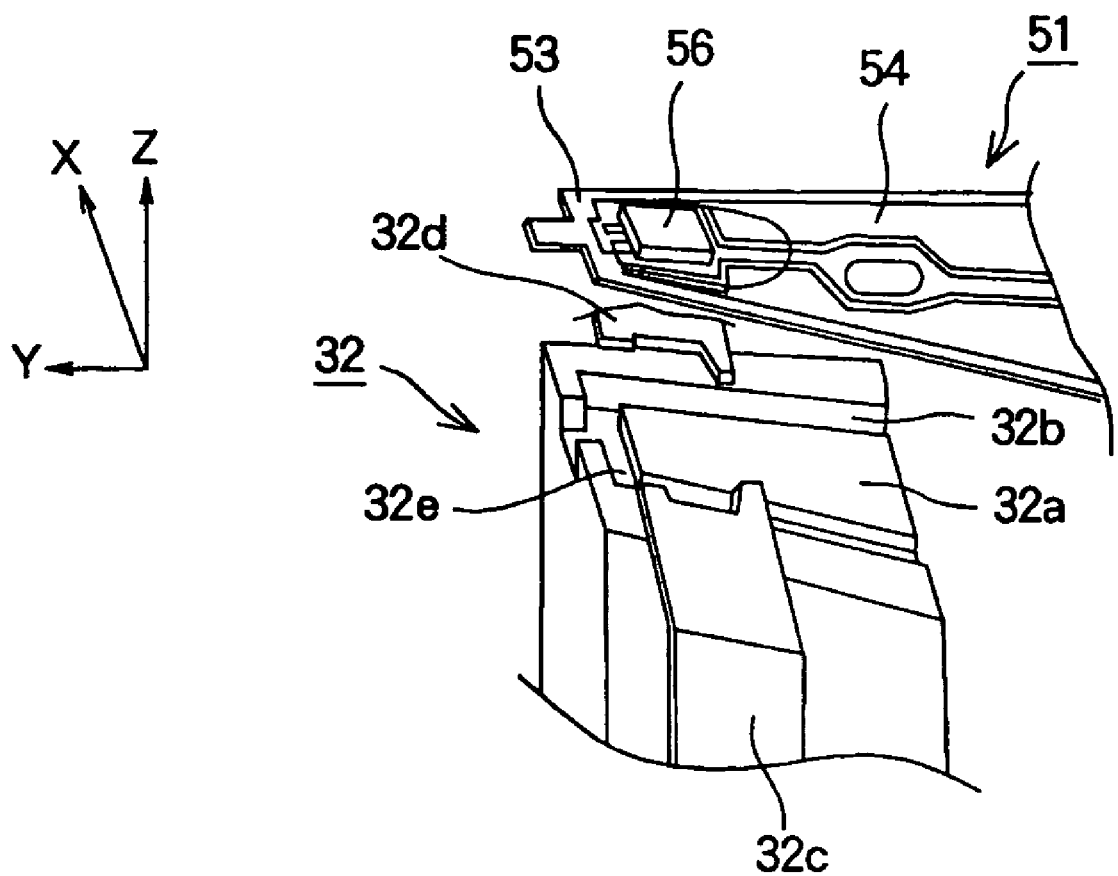
FIG. 19 is a partially expanded view showing an area near the leading end of a positioning-and-holding device 32.
Figure 20:
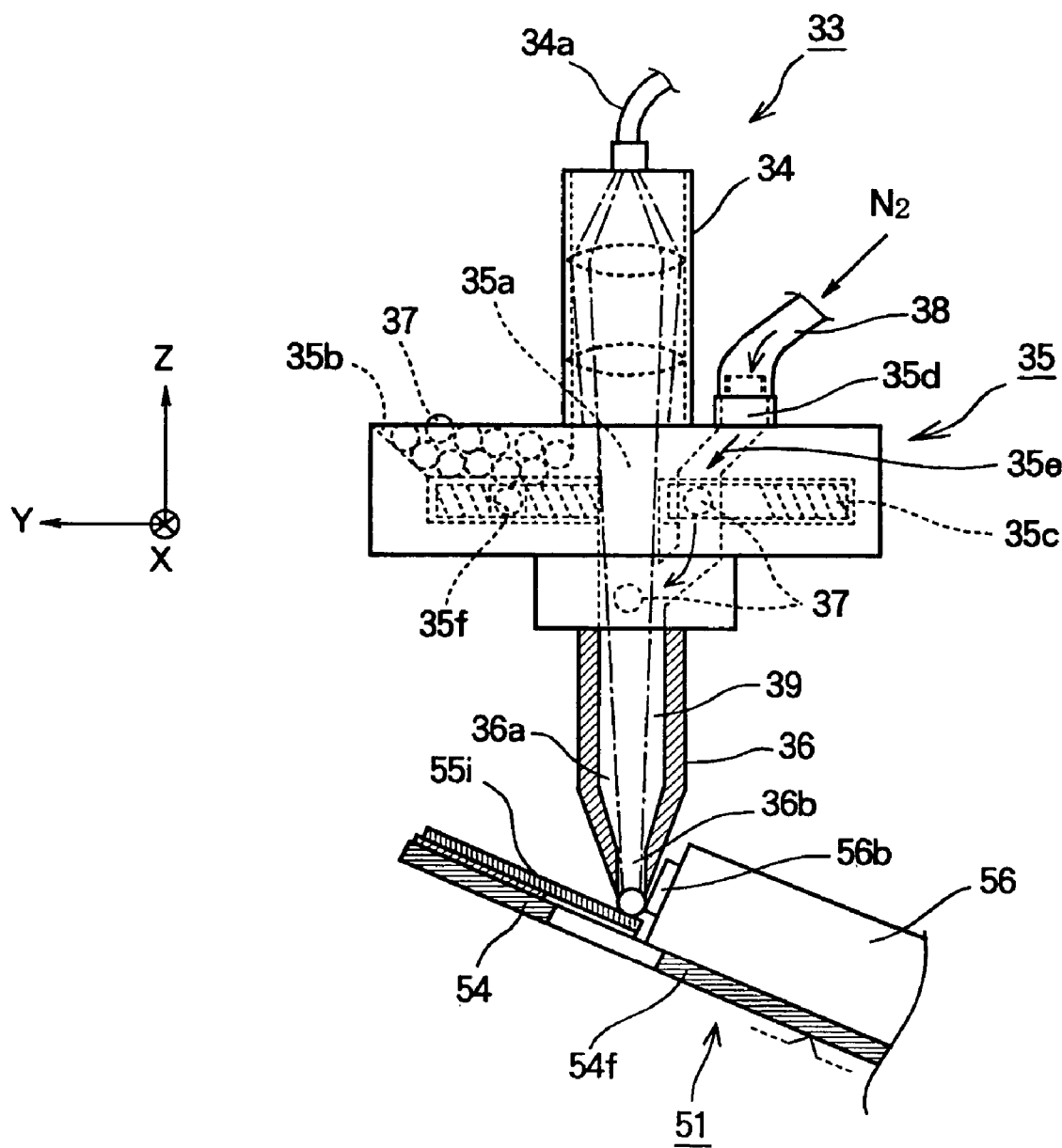
FIG. 20 is a drawing showing the configuration of the pertinent part of a solder-ball bonding device 33.
Figure 21:
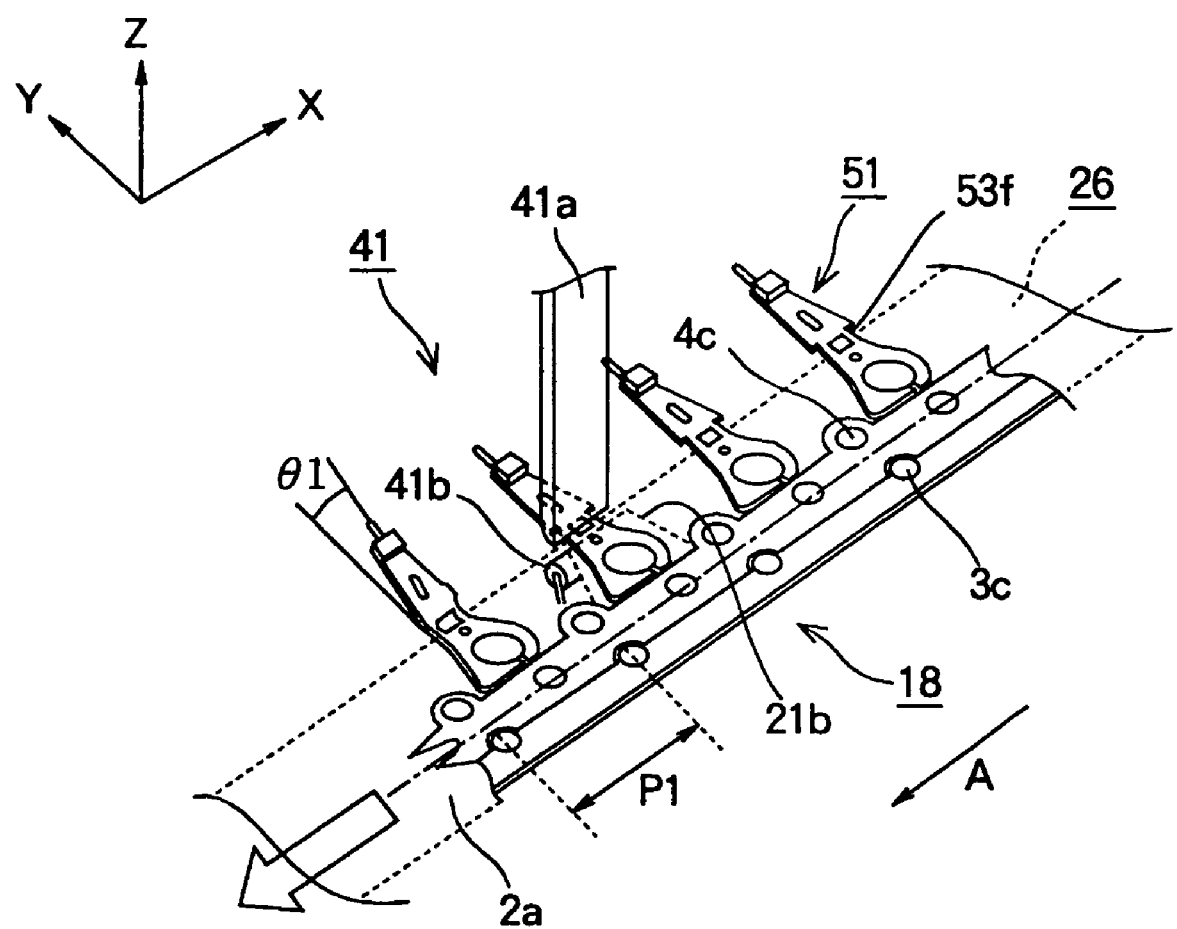
FIG. 21 is a perspective view showing the configuration of the pertinent part of a load-bending device according to a fourth embodiment, for bending a hinge portion 53f of each of HG assemblies 51 in the HGA series 18, in the HG assembly apparatus of the present invention.
Figure 22:
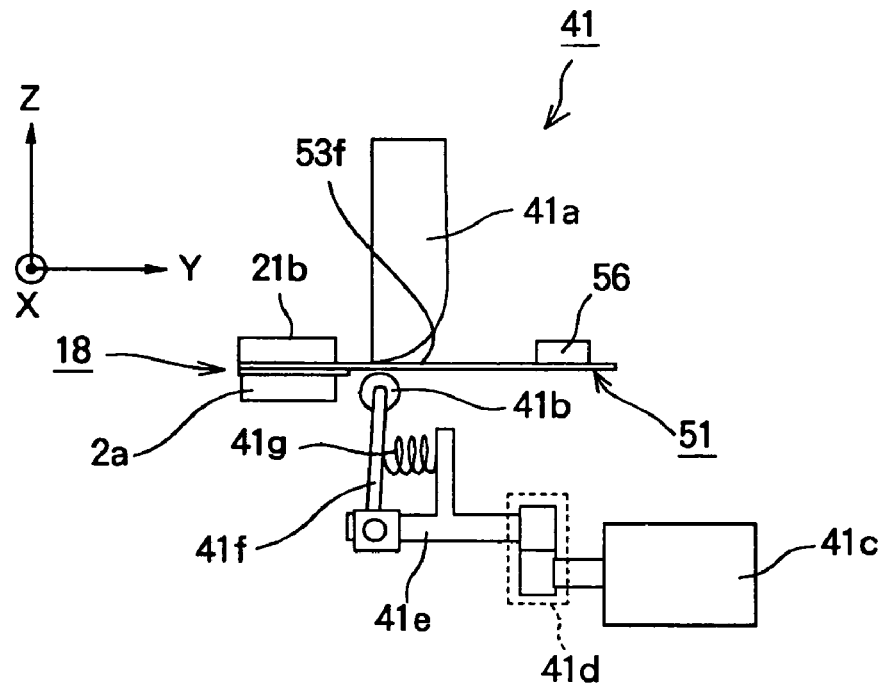
FIGS. 22a to 22b comprise operating principle diagrams schematically showing the configuration of the pertinent part of a load-bending device 41 and its operating states.
Figure 22:
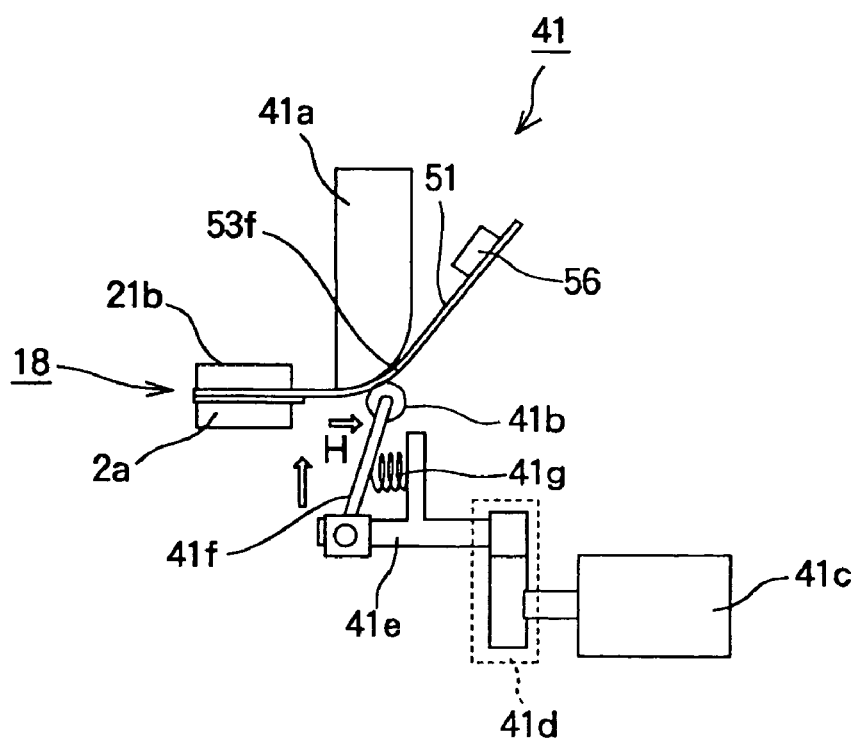
Figure 23:
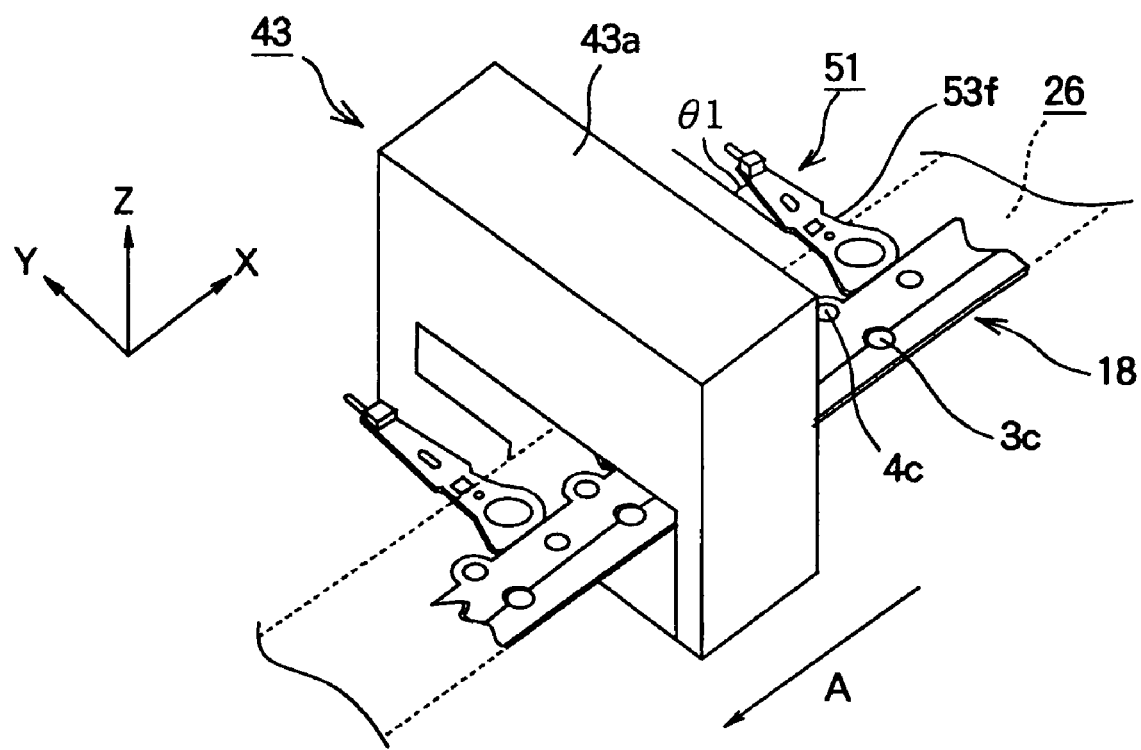
FIG. 23 is a perspective view showing the arrangement of a bending-load adjusting device according to a fifth embodiment, for adjusting a bending load on the HG assembly series 18, in the HG assembly assembling apparatus of the present invention.
Figure 24:
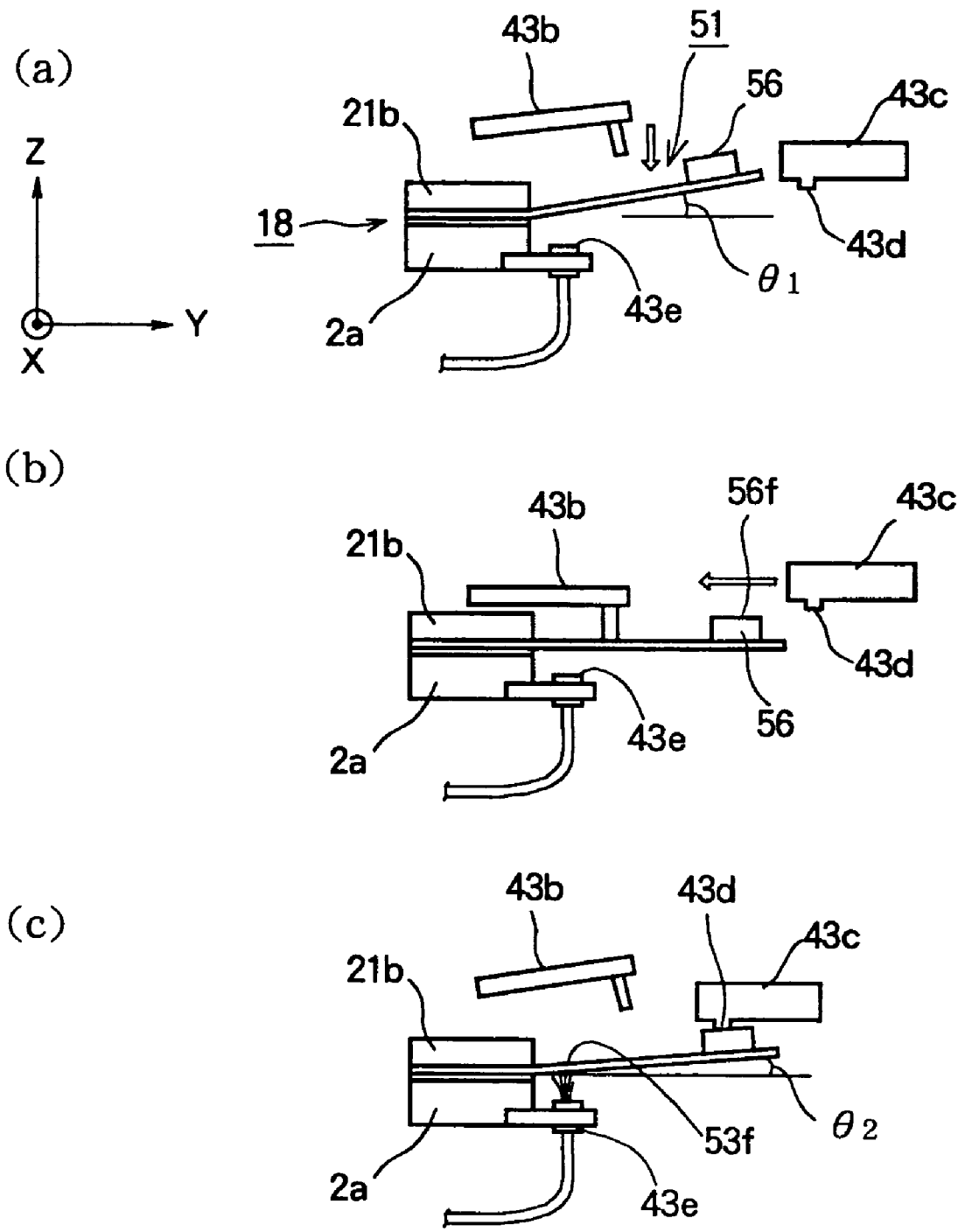
FIGS. 24a to 24c comprise operating principle diagrams schematically showing the configuration of the pertinent part of a bending-load adjusting device 43 under a device cover 43a and its operating states.

When the transfer system 26 transfers the suspension series 17 by the series pitch P1 in the direction of arrow A in the next cycle, the table 27a further is rotated through 90 degrees in synchronization therewith and then comes to rest. The respective operations of the collets 61, 62 and the adhesive applicator 29 are then repeated, so that a slider 56 is attached to a sequentially transferred suspension section 59. By attaching the slider 56 to the suspension section 59 in the slider attaching process as described above, an HG assembly 51 is formed. Herein, a series of the HG assemblies thus formed will be referred to as the HG assembly series 18 (in FIG. 18).

As described above, the slider attacher 25 according to the second embodiment, allows the suspension sections 59 to be transferred in the form of the suspension series 17, and allows the sliders to be attached to the respective suspension sections 59 in the series state. For this reason, the need for trays or assembling blocks as assembling jigs for positioning the suspension sections and the sliders and maintaining their states is eliminated.

What is claimed is:

1. A base plate apparatus, comprising:
   a band portion having conveying holes and positioning holes formed at a first predetermined pitch respectively in a longitudinal direction; and
   a plurality of base plates disposed at an edge on one side of the band portion via single connecting portions integrally formed at a second predetermined pitch at the respective edges of the band portion, said second predetermined pitch being selected based on a utilization of a specific one of the plurality of base plates in an assembly process for generating head gimbals;
   wherein the plurality of base plates are designed for utilizing in a head gimbal assembly formed by one of said plurality of base plates, a load beam, and a flexure disposed one atop another; and
   wherein the plurality of base plates are irregularly shaped relative to a central axis drawn through a middle of each of the base plates and wherein the plurality of base plates each terminate with a flat terminating edge substantially parallel to the longitudinal direction.

2. The base plate apparatus of claim 1, wherein the apparatus is configured with stainless steel and designed to support.

3. A head gimbal assembly comprising:
   a base plate, which is manufactured as one of a plurality of base plates on a base plate structure;
   a load beam; and
   a flexure;
   wherein the base plate, the load beam and the flexure are disposed one atop another;
   wherein the base plate structure is made of a plate member crafted from a material that is more rigid than other plate members for the load beam and the flexure;

wherein the base plate is one of a plurality of base plates disposed via single connecting portions integrally formed at a predetermined pitch at respective edges on one side of a band portion having conveying holes and positioning holes formed therein; and wherein the load beam is one of a series of load beams, said load beam series further comprising:

a second band portion having second conveying holes formed at the predetermined pitch in the longitudinal direction, said second band portion having conveying holes substantially symmetrical to the holes of the first band portion; and a plurality of the load beams disposed via connecting portions integrally formed at edges on one side of the second band portion at the predetermined series pitch.

* * * * *

UNITED STATES PATENT AND TRADEMARK OFFICE
CERTIFICATE OF CORRECTION

PATENT NO. : 7,161,766 B2  
APPLICATION NO. : 10/929507  
DATED : January 9, 2007  
INVENTOR(S) : Kidachi et al.

It is certified that error appears in the above-identified patent and that said Letters Patent is hereby corrected as shown below:

On Page 1, at column 2, line 20, delete "Dillin" and insert --Dillon--.

On Page 5, at column 2, line 30, delete "pith" and insert --pitch--.

Signed and Sealed this

Tenth Day of April, 2007

JON W. DUDAS  
*Director of the United States Patent and Trademark Office*